United States Patent
Ogikubo

(10) Patent No.: US 8,294,968 B2
(45) Date of Patent: Oct. 23, 2012

(54) OPTICAL SCANNING ELEMENT, DRIVING METHOD FOR SAME, AND OPTICAL SCANNING PROBE EMPLOYING OPTICAL SCANNING ELEMENT

(75) Inventor: Shinya Ogikubo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 891 days.

(21) Appl. No.: 12/233,752

(22) Filed: Sep. 19, 2008

(65) Prior Publication Data

US 2009/0080046 A1    Mar. 26, 2009

(30) Foreign Application Priority Data

Sep. 20, 2007 (JP) .................................. 2007-243517

(51) Int. Cl.
    *G02B 26/08* (2006.01)
(52) U.S. Cl. ............... 359/199.1; 359/199.2; 359/200.6; 359/224.1
(58) Field of Classification Search .... 359/198.1–199.4, 359/224.1–224.2, 200.6–200.8
    See application file for complete search history.

(56) References Cited

U.S. PATENT DOCUMENTS

| | | | |
|---|---|---|---|
| 5,629,790 A * | 5/1997 | Neukermans et al. ..... | 359/198.1 |
| 2003/0015652 A1 | 1/2003 | Kandori et al. | |
| 2003/0161020 A1 * | 8/2003 | Wine et al. .................... | 359/198 |
| 2004/0263937 A1 | 12/2004 | Fujii et al. | |
| 2006/0245462 A1 | 11/2006 | Takeda | |

FOREIGN PATENT DOCUMENTS

| | | |
|---|---|---|
| DE | 19712201 A1 | 10/1998 |
| EP | 1372015 A | 12/2003 |
| JP | 4211217 A | 8/1992 |
| JP | 4211218 A | 8/1992 |
| JP | 11-52278 A | 2/1999 |
| JP | 2000-310743 A | 11/2000 |
| JP | 2002365568 A | 12/2002 |
| JP | 2004144926 A | 5/2004 |
| JP | 2005-141229 A | 6/2005 |
| JP | 2006323355 A | 11/2006 |
| JP | 200717769 A | 1/2007 |

OTHER PUBLICATIONS

Hyejun Ra et al: Two—Dimensional MEMS Scanner for Dual-Axes Confocal Microscopy: Journal of Microeletromechanical Systems, vol. 16, No. 4, Aug. 1, 2007, pp. 969-976.
Extended European Search Report dated Dec. 19, 2008.
Office Action issued Oct. 25, 2011 from the Japanese Patent Office in counterpart Japanese application No. 2007243517.

* cited by examiner

*Primary Examiner* — James Phan
(74) *Attorney, Agent, or Firm* — Sughrue Mion, PLLC

(57) ABSTRACT

An optical scanning element is provided and includes: a substrate; a first movable section supported on the substrate so as to be capable of rocking displacement about a first axis parallel to a surface of the substrate; a second movable section arranged integrally on the first movable section and supported so as to be capable of rocking displacement about a second axis perpendicular to the first axis, the second movable section having a micro mirror on an upper surface thereof; and a driving section that applies a physical action force on the first movable section and the second movable section so as to cause the micro mirror to perform rocking displacement in two axial directions about the first axis and the second axis.

16 Claims, 27 Drawing Sheets

A1-A1

B1-B1

A2-A2

B2-B2

A3-A3

B3-B3

OPTICAL SCANNING ELEMENT, DRIVING METHOD FOR SAME, AND OPTICAL SCANNING PROBE EMPLOYING OPTICAL SCANNING ELEMENT

This application is based on and claims priority under 35 U.S.C. §119 from Japanese Patent Application No. 2007-243517 filed Sep. 20, 2007, the entire disclosure of which is herein incorporated by reference.

BACKGROUND OF THE INVENTION

1. Field of the Invention

The present invention relates to: an optical scanning element having a micro mirror displaced by a physical action force; a driving method for the same; and an optical scanning probe employing this optical scanning element. In particular, the present invention relates to a technique preferably applied to a diagnostic probe of an endoscope device for medical application.

2. Description of Related Art

In recent years, as means for observing the minute situation of the surface and the inside a body tissue and a cell, for example, a confocal optical microscope of optical scanning type is known in which an optical scanning element is mounted. It is even discussed that a similar technique employing an optical scanning element is applied to an endoscope. Such a microscope and an endoscope of optical scanning type have advantages that a resolving power exceeding the resolution limit of a general optical system is achieved and that a three dimensional image can be constructed.

As an optical scanning element to be adopted in such application, various types are proposed. In particular, an optical scanning element in which a micro mirror fabricated by micromachining technology is held on a rotational axis of a twist beam and then reciprocally oscillated by an electrostatic force is hopeful from a practical point of view. A detailed example of this optical scanning element is disclosed in IBM J. Res. Develop Vol. 24 (1980). In this configuration, a mirror substrate supported by two beams provided on the same straight line is reciprocally oscillated by an electrostatic attractive force generated relative to an electrode provided at a position opposing to the mirror substrate, in a state that the two beams serve as a twist rotational axis.

In comparison with an optical scanning element employing a rotating polygon mirror in the related art, an optical scanning element formed by micromachining technology has a simple structure and hence can be integrally formed in a semiconductor process. Thus, size reduction is easy and the manufacturing cost is low. Further, because of a single reflecting surface, variation in the precision depending on the individual reflecting surfaces is avoided which could occur in the case of a polygon mirror. Furthermore, the reciprocal scanning permits speed improvement.

As optical scanning elements described above, for example, structures disclosed in JP-A-2000-310743, JP-A-11-52278, and JP-A-2005-141229 are known.

FIGS. 30A and 30B show configurations of optical scanning elements disclosed in JP-A-2000-310743. The optical scanning elements 1A and 1B have configurations for application to an endoscope. The drive system adopted for each optical scanning element is of general electrostatic drive. That is, as shown in FIG. 30A, a voltage is applied between movable electrodes 3a and 3b provided in the left and right parts of a movable section 2 and a fixed electrode not illustrated but installed in an opposing manner. Then, a generated electrostatic force causes rotational displacement in the movable section 2 about a beam 4 serving as the center axis. The shaded region in the figure indicates a mirror part. FIG. 31A shows a configuration of a one-axis mirror. FIG. 31B shows a configuration of a two-axis mirror that performs rotational displacement about the beams 4 and 5 serving as the center axes when a voltage is applied on movable electrodes 3a and 3b and movable electrodes 3c and 3d.

FIG. 31 shows a configuration of an optical scanning element disclosed in JP-A-11-52278. The configuration of the optical scanning element 1C shown in FIG. 31 is, in general, referred to as a comb-tooth electrode structure. That is, the distance between electrodes is small, while the facing area of the electrodes is enhanced. This permits voltage reduction in the driving voltage. Further, since fixed electrodes 6a and 6b are not located in the direction of displacement of a movable section 2 (a direction perpendicular to the figure), a pull-in phenomenon does not occur that the movable section 2 sticks to the fixing electrodes 6a and 6b. This permits a larger scanning angle.

FIG. 32 shows a configuration of an optical scanning element disclosed in JP-A-2005-141229. The optical scanning element 1D shown in FIG. 32 has a comb-tooth electrode structure, similarly to that disclosed in JP-A-2005-141229. Thus, the distance between electrodes is small, while the opposing area of the electrodes is enhanced. This permits voltage reduction in the driving voltage. Further, since fixed electrodes 7a, 7b, 8a, and 8b are not located in the direction of displacement of a movable section 2, a pull-in phenomenon does not occur. This permits a larger scanning angle.

Meanwhile, when an optical scanning element is to be mounted on an endoscope, since the diameter of a probe to be inserted into the forceps port of the endoscope is extremely small, the optical scanning element need be constructed in a remarkably small size. Further, when a confocal optical system is adopted, scanning drive for the optical scanning element need be in two individual axial directions. Nevertheless, in the element shape of an optical scanning element according to the prior art, the ratio of the area occupied by electrodes and support parts to the area of a reflecting surface is comparatively large, and hence the aperture ratio of the reflecting surface is small. This has avoided that the merit of minute fabrication adopting a MEMS (micro electro mechanical system) technique is fully utilized.

Further, in the technique described in JP-A-2000-310743, a support drive region for supporting a mirror need be ensured in the surrounding of the mirror (a shaded region in the figure) serving as a reflecting surface. Thus, the area around the reflecting surface is large. In particular, in the case of a two-axis mirror, support drive regions for the two axes need be ensured. Thus, the ratio (aperture ratio) of the area of the reflecting surface to the area of the entire element is reduced unavoidably. When the optical scanning element is to be installed in the tip part of a thin endoscope probe, the size of the entire element is limited. Thus, the reflecting surface is small, and hence the aperture ratio cannot be high. Further, the size of the movable section 2 is also limited. Thus, available flexibility is low in the element design.

Further, in the technique described in JP-A-11-52278, the electrodes having a comb-tooth structure are located in the horizontal direction of the movable section. Thus, a region used for arranging the comb-tooth electrodes need be ensured in addition to that for the support part. This reduces the aperture ratio further. When the electrode area is reduced, the applied voltage need be increased. This causes difficulty in realizing low voltage drive. Further, in particular, in application to a device such as an endoscope to be inserted into a body, the use of a high voltage is undesired. This causes a problem of insufficient function.

Further, in the technique described in JP-A-2005-141229, similarly to the case of JP-A-11-52278, the electrodes 7a, 7b, 8a, and 8b having a comb-tooth structure are arranged around the movable section 2. Thus, a region used for arranging the comb-tooth electrodes 7a, 7b, 8a, and 8b need be ensured in addition to that for the support part. As such, when a two-axis mirror is to be realized by adopting comb-tooth electrodes, the area necessary for arranging comb-tooth electrodes increases. This reduces the aperture ratio yet further.

SUMMARY OF THE INVENTION

An object of the present invention is to provide: an optical scanning element in which a small optical scanning element that can be mounted on an endoscope is constructed in a manner permitting drive in two individual axial directions and in which the aperture ratio of the optical system can be increased; a driving method for the same; and an optical scanning probe employing this optical scanning element.

The object of the present invention described above can be achieved by the following configurations.

(1) An optical scanning element including:
a substrate;
a first movable section supported on the substrate so as to be capable of rocking displacement about a first axis parallel to a surface of the substrate;
a second movable section arranged integrally on the first movable section and supported so as to be capable of rocking displacement about a second axis perpendicular to the first axis, the second movable section having a micro mirror on an upper surface thereof; and
a driving section that applies a physical action force on the first movable section and the second movable section so as to cause the micro mirror to perform rocking displacement in two axial directions about the first axis and the second axis.

According to this optical scanning element, since the second movable section having a micro mirror is arranged on the first movable section, the micro mirror can be driven in two individual axial directions. Further, the aperture ratio is improved that is the ratio of the area of the exposed reflecting surface of the micro mirror to the area of the entire optical scanning element. That is, the surface of the micro mirror and the surface of the first movable section that supports the micro mirror can be arranged in a manner of overlapping with each other in the thickness direction. Further, the support region necessary for supporting the first movable section and the second movable section in a manner permitting rocking can be arranged in a manner of overlapping with the surface of the micro mirror in the thickness direction. Thus, when the surface of the micro mirror is viewed from the above, the area can be reduced that the support region and the region of the first movable section extend to the surrounding of the surface of the micro mirror.

(2) The optical scanning element described in (1), wherein the driving section is arranged within a region overlapping with at least one of the first movable section and the second movable section in a thickness direction thereof.

According to this optical scanning element, as for the area of the micro mirror, the aperture ratio which is the ratio of the area of the micro mirror to the area of the entire optical scanning element can sufficiently be increased regardless of the installation area for the driving means.

(3) The optical scanning element described in (1) or (2), wherein the driving section includes:

a first driving section that applies a physical action force on the first movable section in a first rotational direction about the first axis;
a second driving section that applies a physical action force on the first movable section in a second rotational direction opposite to the first rotational direction;
a third driving section that applies a physical action force on the second movable section in a third rotational direction about the second axis; and
a fourth driving section that applies a physical action force on the second movable section in a fourth rotational direction opposite to the third rotational direction.

According to this optical scanning element, when the first driving section and the second driving section are controlled, a physical action force for causing rotational displacement about the first axis in the first rotational direction and its opposite direction can be applied on the first movable section. Further, when the third driving section and the fourth driving section are controlled, a physical action force for causing rotational displacement about the second axis in the third rotational direction and its opposite direction can be applied on the second movable section. Thus, the surface of the micro mirror can rock in the individual axial directions.

(4) The optical scanning element described in (3), wherein the third driving section and the fourth driving section are arranged at a height position between the first movable section and the second movable section.

According to this optical scanning element, the third driving section and the fourth driving section are arranged at a height position between the first movable section and the second movable section. Thus, the third driving section and the fourth driving section are arranged at a position close to the second movable section, and hence the distance between the third and the fourth driving sections and the second movable section is reduced. As a result, the generated physical action force can be increased, and hence power-saving is achieved in driving of the rotational displacement of the micro mirror.

(5) The optical scanning element described in any one of (1) to (4), further including a support member arranged in a region overlapping in a thickness direction of the second movable section and connected to the second movable section so as to be capable of elastic displacement.

According to this optical scanning element, the support member that supports the second movable section in a state permitting elastic displacement is arranged in a manner of overlapping with the second movable section in the thickness direction (up and down directions). This avoids that the support member extends to the outside of the surface of the micro mirror provided in the second movable section. Thus, the aperture ratio of the micro mirror is improved further.

(6) The optical scanning element described in any one of (1) to (5), wherein a maximum dimension of the second movable section in a direction perpendicular to the second axis is substantially equal to a maximum dimension of the first movable section in a direction along the first axis.

According to this optical scanning element, the surface of the second movable section having a micro mirror and the surface of the first movable section can be arranged such as to overlap with each other completely in the direction in alignment with the first axis. Thus, the area of the micro mirror can be increased in comparison with the area of the entire optical scanning element. Thus, the aperture ratio is improved further.

(7) The optical scanning element described in any one of (1) to (6), further including a sealed structure in which at least the first movable section and the second movable section are sealed in a reduced pressure state.

According to this optical scanning element the first movable section and the second movable section operate under an environment reduced pressure. This reduces the influence of viscosity of air. In the optical scanning element formed in a remarkably small size, the first movable section and the second movable section are of low mass. Thus, when these sections are to be oscillated (rocked) at a high speed, they are affected by the viscosity of air in the surrounding. This causes difficulty in increasing the oscillation frequency. Thus, when the first movable section and the second movable section are sealed in a reduced pressure state, the first movable section and the second movable section oscillate in air having a density lower than the ordinary one. This reduces the influence of the viscosity of air, and hence permits oscillating (rocking) motion at a high speed.

(8) The optical scanning element described in any one of (1) to (7), wherein the physical action force is an electrostatic force.

According to this optical scanning element, driving is performed by using an electrostatic force. Thus, for example, when a voltage applied between the electrode on the fixed side and the electrode on the movable side is switched, the driving state can easily be controlled.

(9) The optical scanning element described in (8), wherein each of the first movable section and the second movable section has conductive property at least in part and the first movable section and the second movable section are electrically connected to each other.

According to this optical scanning element the region having conductive property formed in the first movable section and the region having conductive property formed in the second movable section form individual electrodes. Thus, when a voltage is applied on the fixed electrodes arranged at positions opposing to these regions, an electrostatic force is generated that serves as a driving force. Further, when the first movable section and the second movable section are electrically connected in common, no electrostatic force is generated between them. This avoids mutual interference between the operation of the first movable section and the operation of the second movable section, and hence permits precise scanning.

(10) A driving method for the optical scanning element described in any one of (1) to (9), including:

performing main scanning drive on the second movable section at a first frequency; and performing sub scanning drive on the first movable section at a second frequency lower than the first frequency such that the second movable section should rock multiple times during the time that the first movable section rocks once.

According to this driving method for an optical scanning element, the second movable section can rock multiple times during the time that the first movable section rocks once. Thus, the direction of orientation of the surface of the micro mirror arranged on the second movable section can be caused to scan in two dimensions in the scanning direction and the sub scanning direction.

(11) The driving method for an optical scanning element described in (10), wherein the first movable section and the second movable section start transiting from one rotational direction to another rotational direction before a lower end of the movable section contacts with a member located beneath a final displacement position of the one rotational direction.

According to this driving method for an optical scanning element, when the first movable section and the second movable section rock individually, rocking is repeated without contacting with other surrounding members. This avoids occurrence of mechanical vibration in association with contact, and hence permits precise control of the direction of orientation of the surface of the micro mirror.

(12) The driving method for an optical scanning element described in (10) or (11), wherein the second movable section is driven to rock at a frequency substantially equal to a resonant frequency of the second movable section.

According to this driving method for an optical scanning element, driving is performed such that the second movable section rocks at a resonant frequency corresponding to the characteristic frequency determined by the shape, the mass, and the like of the second movable section. This permits driving with a necessary minimum driving force, and hence stabilizes the rocking operation.

(13) The driving method for an optical scanning element described in (10) or (11), wherein the second movable section is driven to rock at a frequency higher than a resonant frequency of the second movable section.

According to this driving method for an optical scanning element, driving is performed such that the second movable section rocks at a frequency higher than the resonant frequency corresponding to the characteristic frequency determined by the shape, the mass, and the like of the second movable section. That is, the second movable section is moved forcedly, and hence high speed scanning is achieved. Further, influence of the resonant frequency is avoided, and hence flexibility is improved in the element design.

(14) The driving method for an optical scanning element described in (10) or (11), wherein the second movable section is driven to rock at a frequency lower than a resonant frequency of the second movable section.

According to this driving method for an optical scanning element, driving is performed such that the second movable section rocks at a frequency lower than the resonant frequency corresponding to the characteristic frequency determined by the shape, the mass, and the like of the second movable section. Thus, regardless of the resonant frequency of the second movable section, the scan can be performed sufficiently slowly by using a necessary time.

(15) The driving method for an optical scanning element described in (13) or (14), wherein the first movable section is caused to rock at a frequency substantially equal to a resonant frequency of the structure integrated with the first movable section.

According to this driving method for an optical scanning element, driving is performed such that the first movable section rocks at a resonant frequency corresponding to the characteristic frequency determined by the shape, the mass, and the like of the structure integrated with the first movable section, that is, the structure including the second movable section. This permits driving with a necessary minimum driving force, and hence stabilizes the rocking operation.

(16) An optical scanning probe including:

a probe to be inserted into a body of a test subject;

a light source that generates light for illuminating the test subject;

a light transmitting section that guides the light from the light source to a tip part of the probe;

an optical scanning section that includes an optical scanning element described in any one of (1) to (9) on a tip part of the probe and that performs two-dimensional scan of the test subject with the light guided from the light source to the optical scanning element;

a scanning drive section that provides a drive signal for driving rocking of the micro mirror to the optical scanning element of the optical scanning section; and a reflected light transmitting section that guides, to a base end part, reflected light generated when the light of the two-dimensional scan performed by the optical scanning section is reflected from the test subject.

According to this optical scanning probe, by using the optical scanning element provided in the optical scanning section, two-dimensional scan is performed with light introduced from the light source. Thus, a particular region in the test subject is illuminated, while reflected light (returned light) from this particular region is guided to the base end side so that a two-dimensional image of the particular region is detected.

(17) The optical scanning probe described in (16), including a member having a confocal pin hole in which a pin hole is formed between the light source and the optical scanning section and in which light passing through the pin hole forms substantially a point light source so that a confocal optical system is constructed with respect to the test subject.

According to this optical scanning probe, a confocal optical system is constructed. Thus, when two-dimensional scan of light is performed using the optical scanning element, the light figure of only an in-focus region (scanning position) can be detected among the objects in a test subject. Further, illumination light is illuminated onto the object in the test subject via the confocal optical system through the pin hole serving as a point light source. Thus, the illumination light is illuminated intensively onto the in-focus point only. This avoids generation of unnecessary scattered light in the periphery of the scanning position, and hence permits detection of a high contrast image at the scanning position. Further, when such a confocal optical system is employed, illumination light and returned light can be guided through a thin member like an optical fiber. Thus, a thin and long optical scanning probe can be constructed that can preferably be employed in an endoscope.

BRIEF DESCRIPTION OF THE DRAWINGS

The features of the invention will appear more fully upon consideration of the exemplary embodiments of the inventions, which are schematically set forth in the drawings, in which:

FIG. 28A is a perspective view showing an overall configuration of an analysis model, FIG. 28B is a plan view showing the shape and the dimensions of a first movable plate, and FIG. 28C is a plan view showing the shape and the dimensions of a second movable section;

Figure 1:
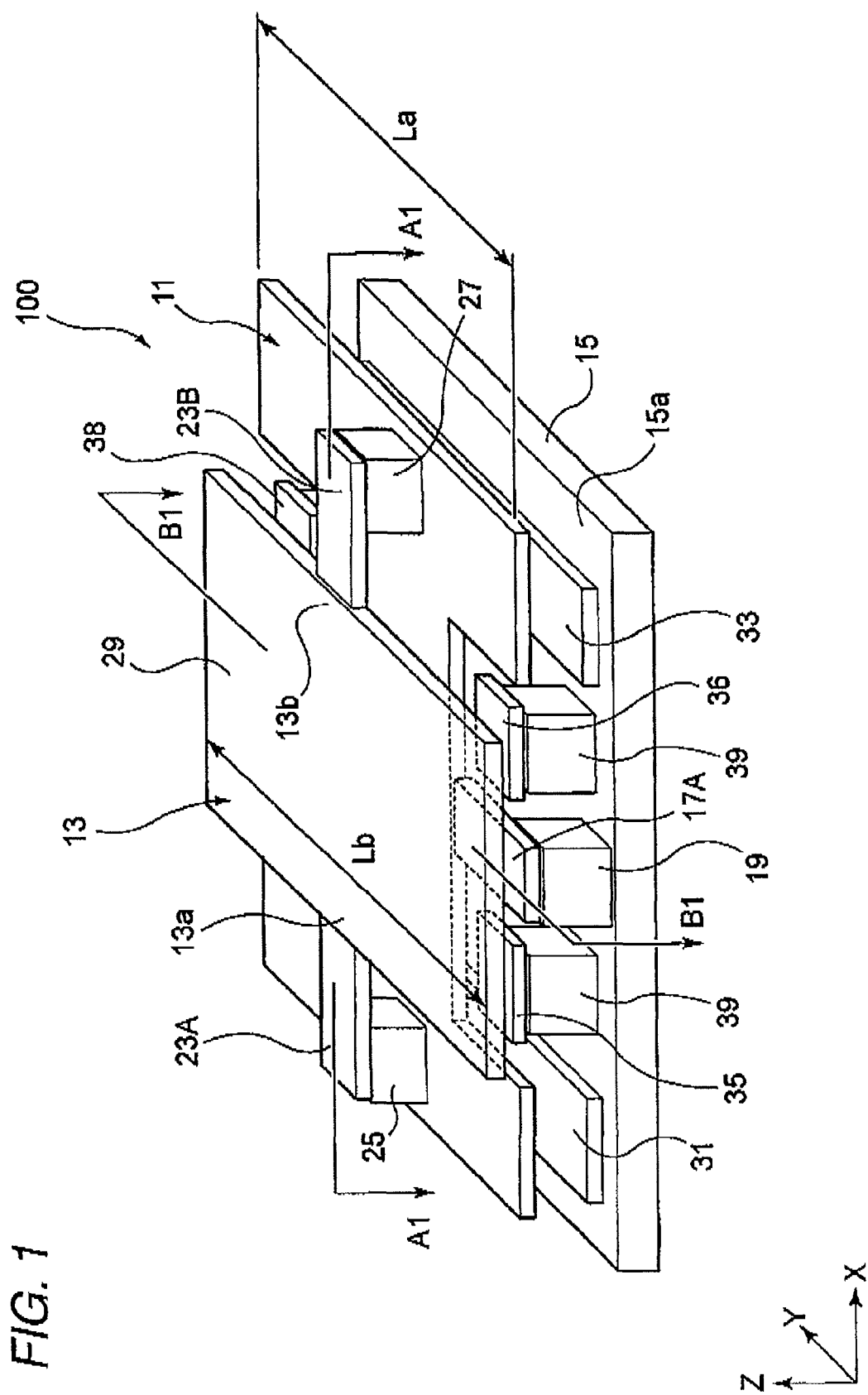
FIG. 1 is a perspective view showing a basic structure of an optical scanning element according to a first exemplary embodiment.

11: First movable plate
13, 14: Second movable plate
13a, 13b: End part

15: Substrate
15a: Upper surface
17A, 17B: Elastic support beam
19, 21: First support part
23A, 23B: Elastic support beam
25, 27: Second support part
29: Micro mirror
31, 33: First fixed electrode
35, 36, 37, 38: Second fixed electrode
39, 40: Support bed
41: Drive unit
43: Driving voltage control circuit
45: Memory circuit
51: Elastic support beam
53: Joint part
55: SOI substrate
57: Drive circuit
81: Sheath
83: Endoscope
85: Forceps port
87: Insert part
89: Operation section
91: Signal processor
93: Display section
95: Light source
97: Light detection section
99: Optical coupler
100, 200, 300: Light scanning element
101: Optical fiber
103: Control section
105: Scanning drive section
107: Test subject
111: Tip frame
113: Linkage part
115: Signal line
117: Holding member
117a, 117b: Communicating hole
119: Ferrule
121: Packing
123: Internal space
125: Cover glass
127: Condenser lens
129: Collimator lens
131: Correction table
133: Package
135: Cover glass
137: Drive circuit
141: Packaged element
143: Reduced pressure space
400: Light scanning probe

DETAILED DESCRIPTION OF THE
EXEMPLARY EMBODIMENTS

According to an optical scanning element and a driving method for the same in an aspect of the present invention, since the second movable section having a micro mirror is arranged on the first movable section, the micro mirror can be driven in two individual axial directions. Further, the aperture ratio is improved that is the ratio of the area of the exposed reflecting surface of the micro mirror to the area of the entire optical scanning element. Thus, even in a case that the location of installation for the optical scanning element is extremely small and hence the element size need be reduced, a large effective area can be ensured in the micro mirror.

Further, according to an optical scanning probe in an aspect of the present invention, two-dimensional scan is performed with light by using the optical scanning element provided in the optical scanning section. Thus, a particular region in the test subject is illuminated, while reflected light (returned light) from this particular region is guided to the base end side so that a two-dimensional image of the particular region is detected. Further, since the aperture ratio of the micro mirror is high, even in a case of application such as an endoscope having a small diameter, a high resolution image of an object (the surface of a body tissue or a cell, the inside of an industrial product, and the like) can be detected.

Exemplary embodiments of an optical scanning element, a driving method for the same, and an optical scanning probe according to an aspect of the present invention are described below in detail with reference to the drawings.

First Embodiment

The optical scanning element assumed in the present embodiment is, for example, one having a remarkably small size (for example, the maximum dimension is approximately 7 mm or smaller) that can be mounted in an internal space near the end of a probe of an endoscope. Obviously, in other applications, a somewhat larger optical scanning element may be constructed.

Figure 2:
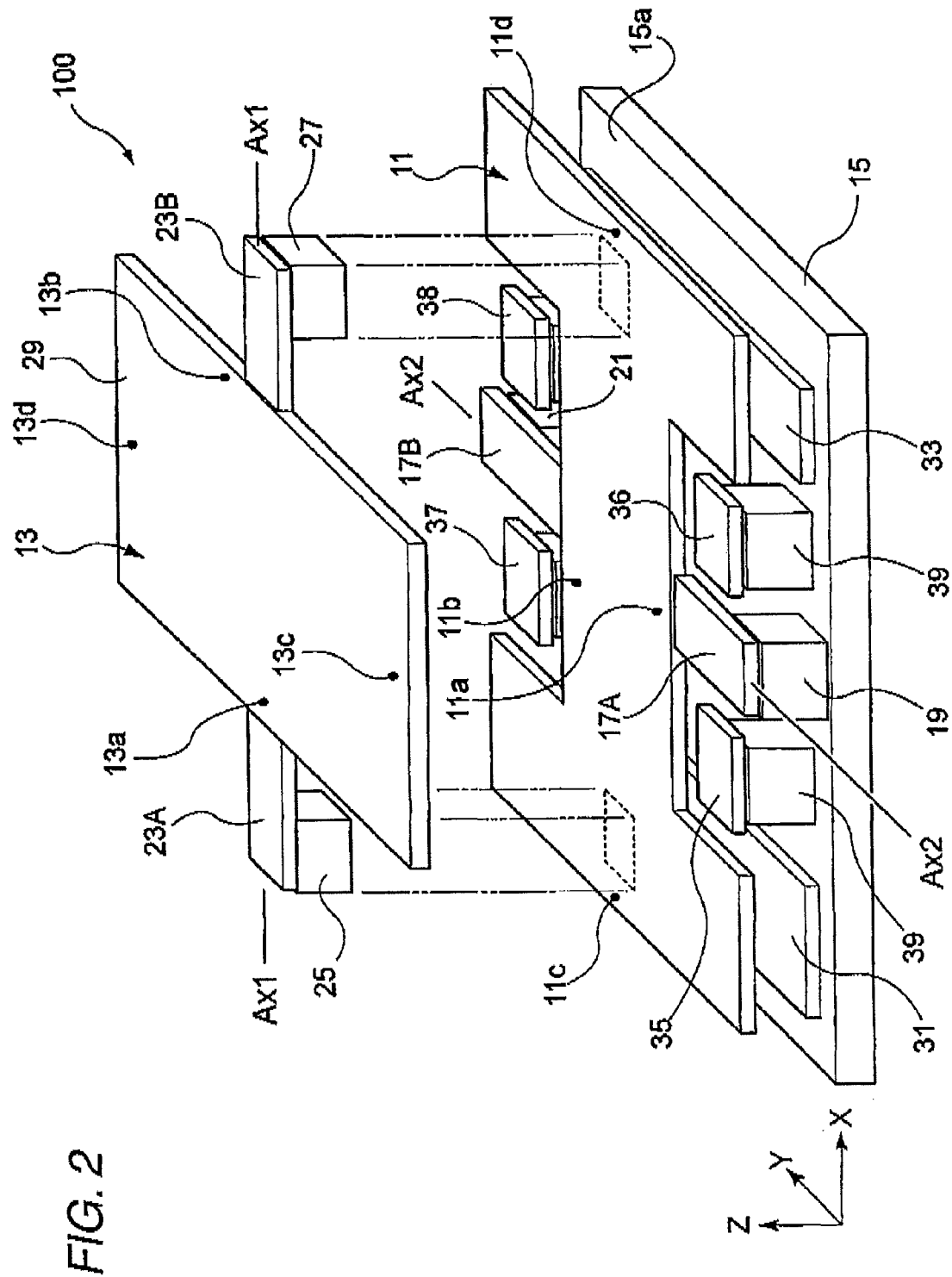
FIG. 2 is a partly exploded perspective view of an optical scanning element shown in FIG. 1.
Figure 3:
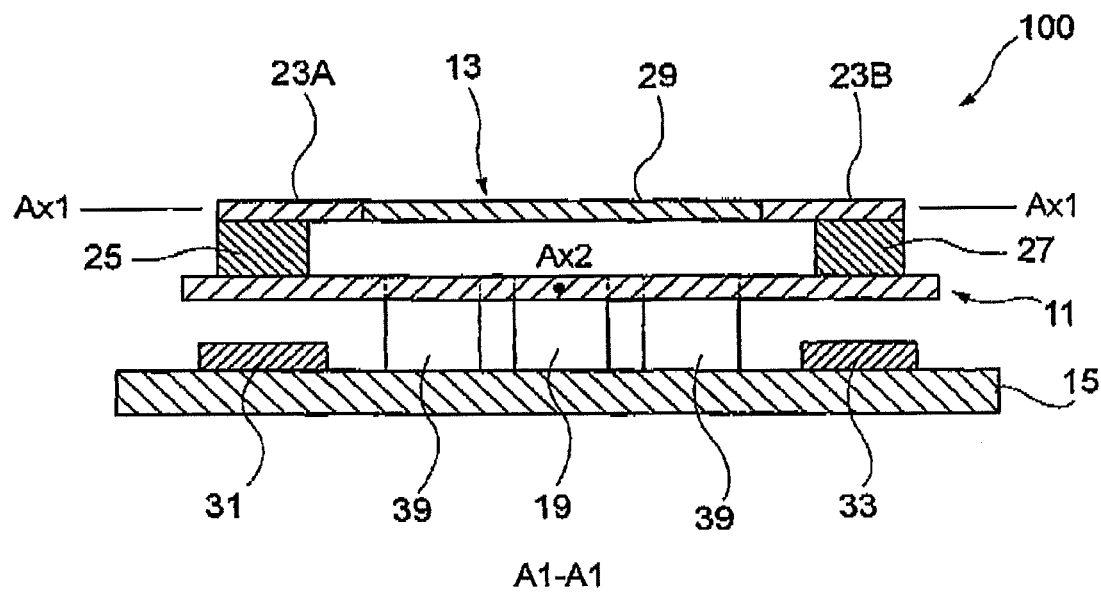
FIG. 3 is a longitudinal sectional view taken along line A1-A1 in FIG. 1.
Figure 4:
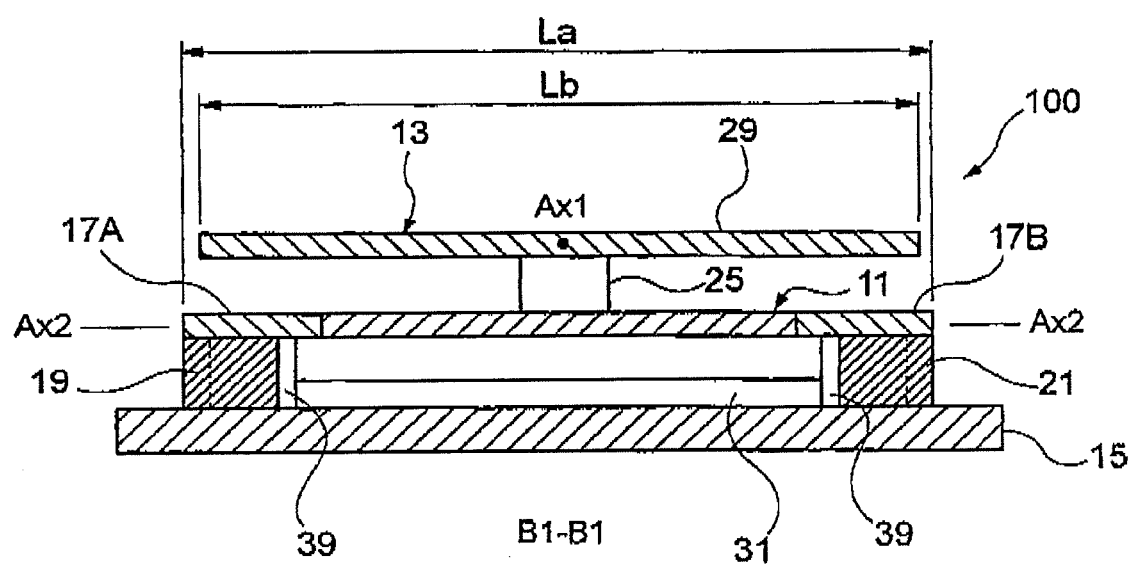
FIG. 4 is a longitudinal sectional view taken along line B1-B1 in FIG. 1.

FIG. 1 is a perspective view showing a basic structure of an optical scanning element according to a first exemplary embodiment. FIG. 2 is a partly exploded perspective view of the optical scanning element shown in FIG. 1. FIG. 3 is a longitudinal sectional view taken along line A1-A1 in FIG. 1. FIG. 4 is a longitudinal sectional view taken along line B1-B1 in FIG. 1.

As shown in FIG. 1, the optical scanning element 100 has movable sections including a first flat plate-shaped movable plate (first movable section) 11 and a second movable plate (second movable section) 13 arranged integrally on the first movable plate 11. The first movable plate 11 and the second movable plate 13 are arranged at positions overlapping up and down with each other on the substrate 15 in a manner of overlapping in the thickness direction (Z-direction in the figure). These two are supported in a manner permitting independent inclination. Further, as shown in FIG. 2, the first movable plate 11 has an H shape in a plan view, while the plan shape of the second movable plate 13 is a rectangle. These two are individually formed in a uniform thickness.

As shown in FIGS. 2 and 4, in the first movable plate 11, two end parts 11a and 11b located in the center of the X-direction are linked respectively to first support parts 19 and 21 via elastic support beams 17A and 17B serving as support members. By this, the first movable plate 11 is supported in a manner permitting inclination about a rotational axis Ax2. The elastic support beams 17A and 17B form individual twist beams composed of elastic material, and are fixed on the first support parts 19 and 21 formed on the substrate 15.

The first movable plate 11 is supported by the first support parts 19 and 21 via the elastic support beams 17A and 17B composed of elastic material, and hence is capable of rotational displacement about the rotational axis Ax2. In practice, the allowable range of rotational displacement is limited. Thus, when a force is applied from the outside, the first movable plate 11 rocks about the rotational axis Ax2.

As shown in FIGS. 2 and 3, in the second movable plate 13, two end parts 13a and 13b located in the center of the Y-direction are linked respectively to second support parts 25 and 27 via elastic support beams 23A and 23B serving as support members. By this, the second movable plate 13 is supported in a manner permitting inclination about a rotational axis Ax1. The elastic support beams 23A and 23B form individual twist beams composed of elastic material, and are fixed on the second support parts 25 and 27 formed on the first movable plate 11.

The second movable plate 13 is supported by the second support parts 25 and 27 via the elastic support beams 23A and 23B composed of elastic material, and hence is capable of rotational displacement about the rotational axis Ax1. In practice, the allowable range of rotational displacement is limited. Thus, when a force is applied from the outside, the second movable plate 13 rocks about the rotational axis Ax1.

Thus, the second movable plate 13 is supported on the first movable plate 11 via the second support parts 25 and 27, while the first movable plate 11 is supported on the substrate 15 via the first support parts 19 and 21. Thus, the surface direction of the second movable plate 13 inclines about the rotational axis Ax2 in association with the rotational displacement of the first movable plate 11, and further inclines about the rotational axis Ax1 in association with the rotational displacement of the second movable plate 13. That is, the surface direction of the second movable plate 13 is displaced in two individual axial directions relative to the substrate 15. On the upper surface of the second movable plate 13, a micro mirror 29 serving as a light reflecting surface is formed in a manner of covering the entire upper surface.

As shown in FIGS. 2 and 3, on the upper surface 15a of the substrate 15, first fixed electrodes 31 and 33 having a thin plate shape are provided respectively in the lower surface near the two end parts in the X-direction of the first movable plate 11 and at the opposing positions in the thickness direction (Z-direction). Here, the dimension of the first fixed electrodes 31 and 33 in the Y-direction is substantially equal to the dimension of the first movable plate 11 in the Y-direction. Further, in the first movable plate 11, its entirety is composed of electrically conductive material, or alternatively its surface is covered with an electrically conductive film. Further, within the first movable plate 11, at least the regions opposing to the first fixed electrodes 31 and 33 may be formed with electrically conductive material. Even when this approach is adopted, the first movable plate 11 serves substantially as a movable electrode having conductive property. The above-mentioned first fixed electrodes 31 and 33 serve as first and second driving sections for applying a physical action force on the first movable plate 11 in the first rotational direction and the second rotational direction about the first axis Ax2.

Further, as shown in FIG. 2, on the upper surface 15a of the substrate 15, second fixed electrodes 35, 36, 37, and 38 are provided respectively on support bases 39 at positions opposing to the lower surfaces near the two end parts in the Y-direction of the second movable plate 13. These second fixed electrodes 35, 36, 37, and 38 are arranged in recessed regions where the width of the first movable plate 11 in the Y-direction is narrow. Each of the second fixed electrodes 35, 36, 37, and 38 has a height that causes its upper surface position to be substantially equal to the upper surface of the first movable plate 11.

Here, the second fixed electrode 35 is arranged between the first fixed electrode 31 and the first support part 19, while the second fixed electrode 36 is arranged between the first fixed electrode 33 and the first support part 19. These are arranged in a recessed region of the first movable plate 11. The second fixed electrodes 37 and 38 on the opposite side are arranged similarly.

Further, in the second movable plate 13, its entirety is composed of electrically conductive material, or alternatively its surface is covered with an electrically conductive film. Further, among the individual regions in the second movable plate 13, at least the regions opposing to the second fixed electrodes 35, 36, 37, and 38 may be formed with electrically conductive material. When this approach is adopted, the second movable plate 13 serves substantially as a movable electrode having conductive property. The above-mentioned second fixed electrodes 35, 36, 37, and 38 serve as third and fourth driving sections for applying a physical action force on the second movable plate 13 in the third rotational direction and the fourth rotational direction about the second axis Ax1.

As shown in FIGS. 1 and 4, in the optical scanning element 100 having the above-mentioned configuration, the maximum dimension La of the first movable plate 11 in the Y-direction is substantially equal to the maximum dimension Lb of the second movable plate 13 and the micro mirror 29 in the Y-direction. That is, the first support parts 19 and 21 and the second fixed electrodes 35, 36, 37, and 38 are arranged in recessed regions where the width of the first movable plate 11 in the Y-direction is narrow. Thus, when the entire optical scanning element 100 is viewed from the above in the Z-direction, the first support parts 19 and 21 and the second fixed electrodes 35, 36, 37, and 38 are hidden under the second movable plate 13.

That is, the first to the fourth driving sections arranged within a region overlapping with each other in the thickness direction of at least any one of the movable plates 11 and 13. Thus, as for the area of the micro mirror 29, regardless of the space necessary for arranging the first support parts 19 and 21 and the second fixed electrodes 35, 36, 37, and 38, the aperture ratio which is the ratio of the area of the micro mirror 29 to the area of the entire optical scanning element 100 can be increased sufficiently.

The following description is given for the basic operation of causing rotational displacement in the first movable plate 11 and the second movable plate 13 of the optical scanning element 100 having the above-mentioned configuration.

Figure 5:
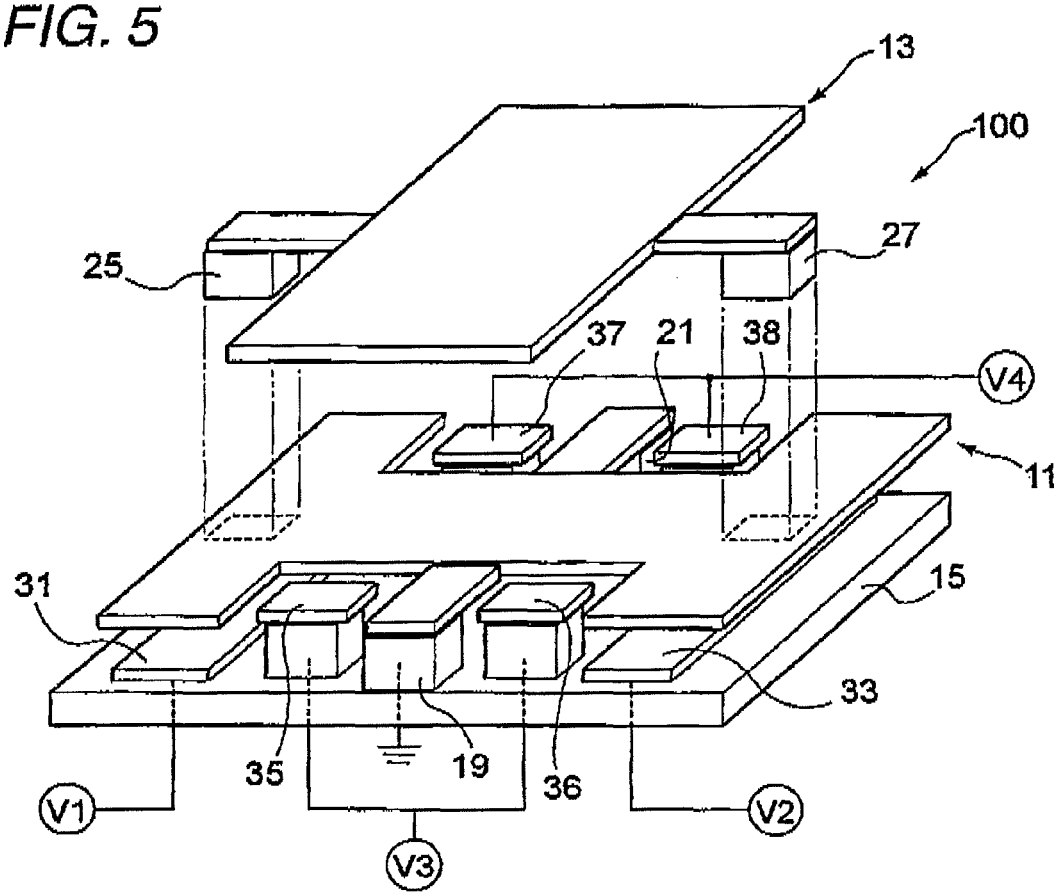
FIG. 5 is an explanation diagram showing a state of connection between an optical scanning element and electric signals for driving it.

FIG. 5 is an explanation diagram showing the state of connection between an optical scanning element and electric signals for driving it.

When the optical scanning element 100 is to be driven, as shown in FIG. 5, drive signals φV1 to φV4 are applied on the individual electrodes. That is, the drive signal φV1 is applied on the first fixed electrode 31, the drive signal φV2 is applied on the first fixed electrode 33, the drive signal φV3 is applied on the second fixed electrodes 35 and 36, and the drive signal φV4 is applied on the second fixed electrodes 37 and 38. Further, the first movable plate 11, the second movable plate 13, and the first support parts 19 and 21 and the second support parts 25 and 27 that support these plates are electrically connected in common. These are connected to the ground and hence have the ground potential.

Figure 6:
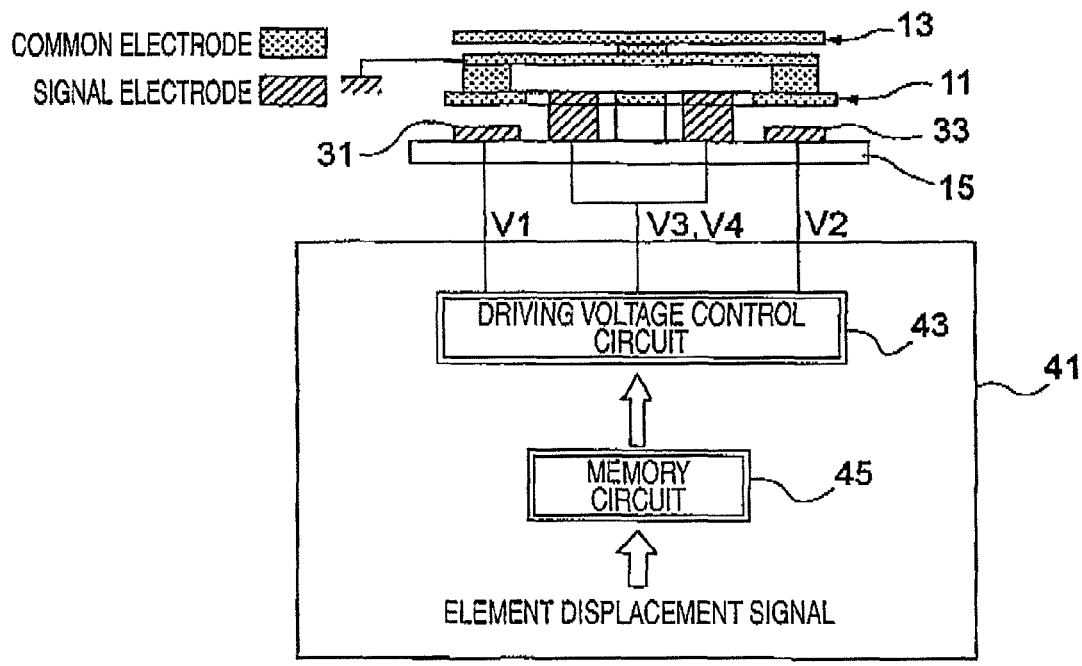
FIG. 6 is a block diagram showing an optical scanning element and an electric circuit for driving it.

FIG. 6 is a block diagram showing an optical scanning element and an electric circuit for driving it.

The drive unit 41 shown in FIG. 6 has a driving voltage control circuit 43 and a memory circuit 45. The driving voltage control circuit 43 generates the drive signals φV1 to φV4 to be applied on the individual electrodes of the optical scanning element 100. Before the driving of the element, the memory circuit 45 holds information concerning the signal waveforms to be outputted as the individual drive signals φV1 to φV4, in correspondence to the amount of displacement of inclination about each axis for the micro mirror 29 of the optical scanning element 100. When an instruction of the amount of displacement is inputted from the outside, the memory circuit 45 provides to the driving voltage control circuit 43 the information necessary for generating the signal waveform corresponding to the amount of displacement. On the basis of the information inputted from the memory circuit 45, the driving voltage control circuit 43 generates the waveforms of the individual drive signals φV1 to φV4 at necessary timings.

Here, the region having conductive property formed in the first movable plate 11 and the region having conductive property formed in the second movable plate 13 form common electrodes respectively. Then, they are electrically connected to each other. Thus, when a voltage is applied on the fixed electrodes 31 and 33 and the like arranged at positions opposing to these regions, an electrostatic force is generated that serves as a driving force. Further, when the first movable plate 11 and the second movable plate 13 are electrically connected in common, no electrostatic force is generated between them. This avoids mutual interference between the operation of the first movable plate 11 and the operation of the second movable plate 13, and hence permits precise scanning.

Figure 7A:
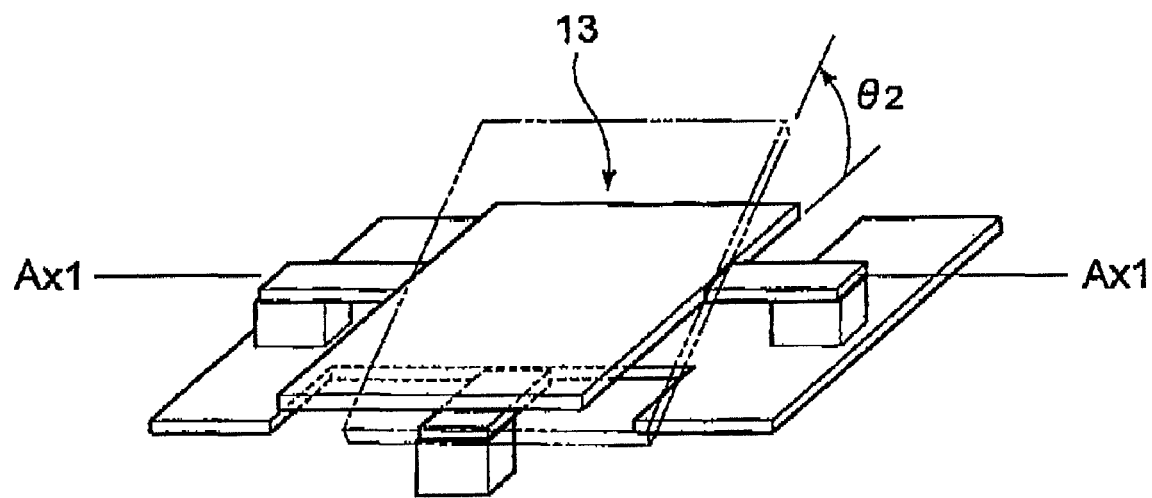
FIG. 7A is an explanation diagram showing a situation of rotational displacement in a second movable plate of an optical scanning element.
Figure 7B:
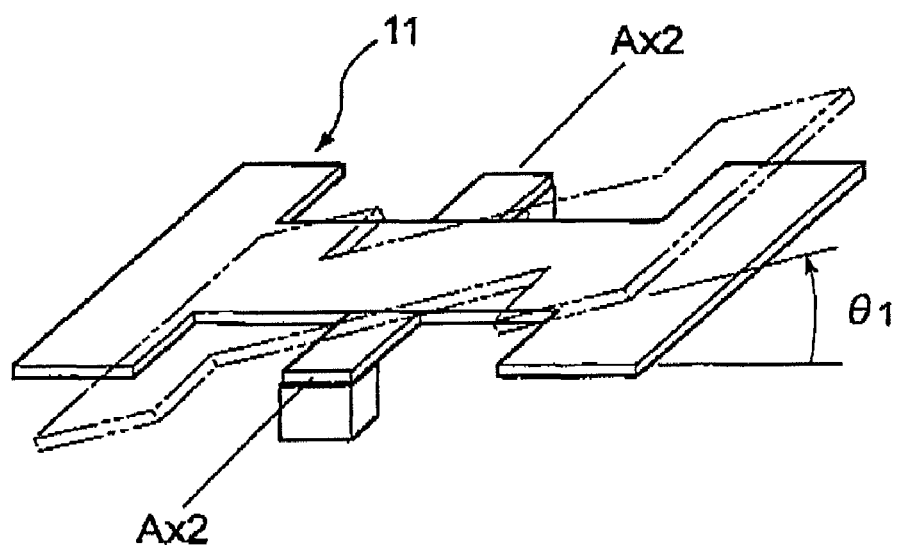
FIG. 7B is an explanation diagram showing a situation of rotational displacement in a second movable plate.

FIG. 7A is an explanation diagram showing a situation of rotational displacement in the second movable plate of the optical scanning element. FIG. 7B is an explanation diagram showing a situation of rotational displacement in the first movable plate.

As shown in FIG. 7A, the second movable plate 13 of the optical scanning element inclines about the rotational axis Ax1 (an inclination angle θ2). Further, as shown in FIG. 7B, the first movable plate 11 inclines about the rotational axis Ax2 (an inclination angle θ1).

Next, driving operation for each of the first movable plate 11 and the second movable plate 13 is described below.

Figure 8:
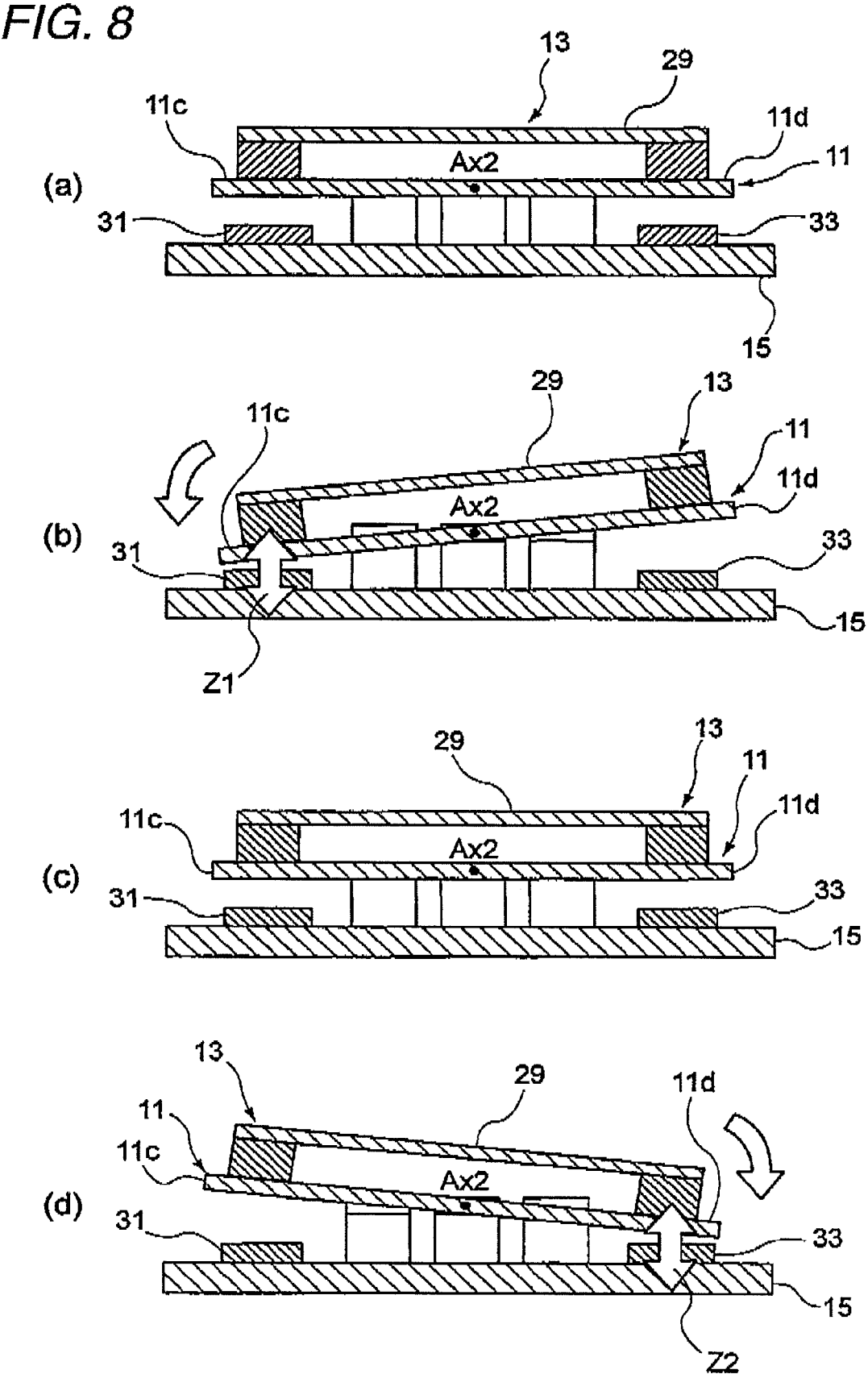
FIG. 8 is an explanation diagram showing operating situations (a) to (d) of a first movable plate in a case that an optical scanning element is viewed from the same direction as that in FIG. 3.

FIG. 8 is an explanation diagram showing operating situations (a) to (d) of the first movable plate in a case that the optical scanning element is viewed from the same direction as that in FIG. 3.

Here, it is assumed that the first movable plate 11 is composed of electrically conductive material and that the entire plate surface serves as an electrode.

In a steady state where the potential differences between the first movable plate 11 and the first fixed electrode 31 and between the first movable plate 11 and the first fixed electrode 33 are 0, the surface of the substrate 15 and the surface of the first movable plate 11 are arranged in parallel to each other as shown in FIG. 8(a). Here, it is assumed that the surface of the second movable plate 13 is in a state of being parallel to the surface of the first movable plate 11.

Then, a drive signal for causing a voltage difference between the first fixed electrode 31 and the first movable plate 11 is applied. Thus, as shown in FIG. 8(b), an electrostatic attractive force in the arrow Z1 direction acts between the first fixed electrode 31 and the opposing end part 11c of the first movable plate 11. Accordingly, the first movable plate 11 and the second movable plate 13 on the first movable plate 11 perform counterclockwise rotational displacement about the rotational axis Ax2. Thus, the first movable plate 11 inclines.

In the state shown in FIG. 8(b), when the potential difference between the first fixed electrode 31 and the first movable plate 11 is set to be 0 again, the electrostatic attractive force disappears between the first fixed electrode 31 and the opposing end 11c of the first movable plate 11. Accordingly, elastic restoring forces in the elastic support beams 17A and 17B (see FIG. 2) bring the optical scanning element into a state shown in FIG. 8(c) (the same state as that in FIG. 8(a)).

Then, a drive signal for causing a voltage difference between the first fixed electrode 33 and the first movable plate 11 is applied. Thus, as shown in FIG. 8(d), an electrostatic attractive force in the arrow Z2 direction acts between the first fixed electrode 33 and the opposing end part 11d of the first movable plate 11. Accordingly, the first movable plate 11 and the second movable plate 13 on the first movable plate 11 perform clockwise rotational displacement about the rotational axis Ax2. Thus, the first movable plate 11 inclines. Further, when the potential difference is set to be 0 in this state, the elastic restoring forces in the elastic support beams 17A and 17B bring the optical scanning element into a state shown in FIG. 8(c) (the same state as that in FIG. 8(a)).

The following description is given for the basic operation of causing rotational displacement in the second movable plate 13 of the optical scanning element 100 having the above-mentioned configuration.

Figure 9:
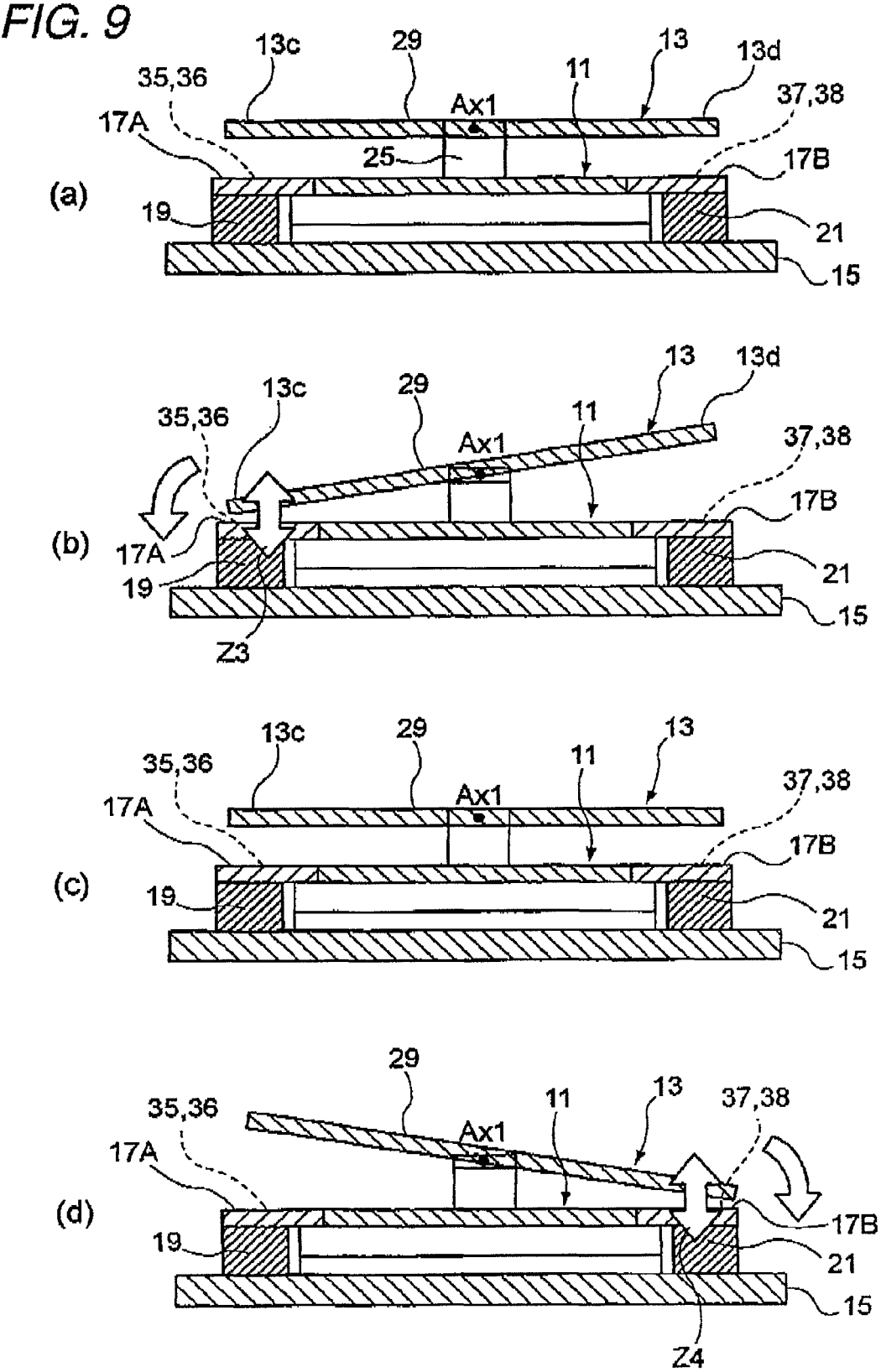
FIG. 9 is an explanation diagram showing operating situations (a) to (d) in a case that an optical scanning element is viewed from the same direction as that in FIG. 4.

FIG. 9 is an explanation diagram showing operating situations (a) to (d) in a case that the optical scanning element is viewed from the same direction as that in FIG. 4.

Here, it is assumed that the second movable plate 13 is composed of electrically conductive material and that the entire plate surface serves as an electrode.

In a steady state where the potential differences between the second movable plate 13 and the second fixed electrodes 35 and 36 and between the second movable plate 13 and the second fixed electrode 37 and 38 are 0, the surface of the substrate 15 and the surface (the reflecting surface of the micro mirror 29) of the second movable plate 13 are arranged in parallel to each other as shown in FIG. 9(a). Here, it is assumed that the surface of the first movable plate 11 is in a state of being parallel to the surface of the substrate 15.

Here, a drive signal for causing a voltage difference between the second fixed electrodes 35 and 36 and the second movable plate 13 is applied. Then, as shown in FIG. 9(b), an electrostatic attractive force in the arrow Z3 direction acts between the second fixed electrodes 35 and 36 and the opposing end part 13c of the second movable plate 13. Accordingly, the second movable plate 13 performs counterclockwise rotational displacement about the rotational axis Ax1. Thus, the second movable plate 13 inclines.

In the state shown in FIG. 9(b), when the potential difference between the second fixed electrodes 35 and 36 and the second movable plate 13 is set to be 0 again, the electrostatic attractive force disappears between the second fixed electrodes 35 and 36 and the opposing end 13c of the second movable plate 13. Accordingly, elastic restoring forces in the elastic support beams 23A and 23B (see FIG. 2) bring the optical scanning element into a state shown in FIG. 9(c) (the same state as that in FIG. 9(a)).

Then, a drive signal for causing a voltage difference between the second fixed electrodes 37 and 38 and the second movable plate 13 is applied. Thus, as shown in FIG. 9(d), an electrostatic attractive force in the arrow Z4 direction acts between the second fixed electrodes 37 and 38 and the opposing end part 13d of the second movable plate 13. Accordingly, the second movable plate 13 performs clockwise rotational displacement about the rotational axis Ax1. Thus, the second movable plate 13 inclines. Further, when the potential difference is set to be 0 in this state, the elastic restoring forces in the elastic support beams 23A and 23B bring the optical scanning element into a state shown in FIG. 9(c) (the same state as that in FIG. 9(a)).

Next, the drive signals for driving the optical scanning element 100 are described below with reference to detailed examples.

(First Example of Driving)

Figure 10:
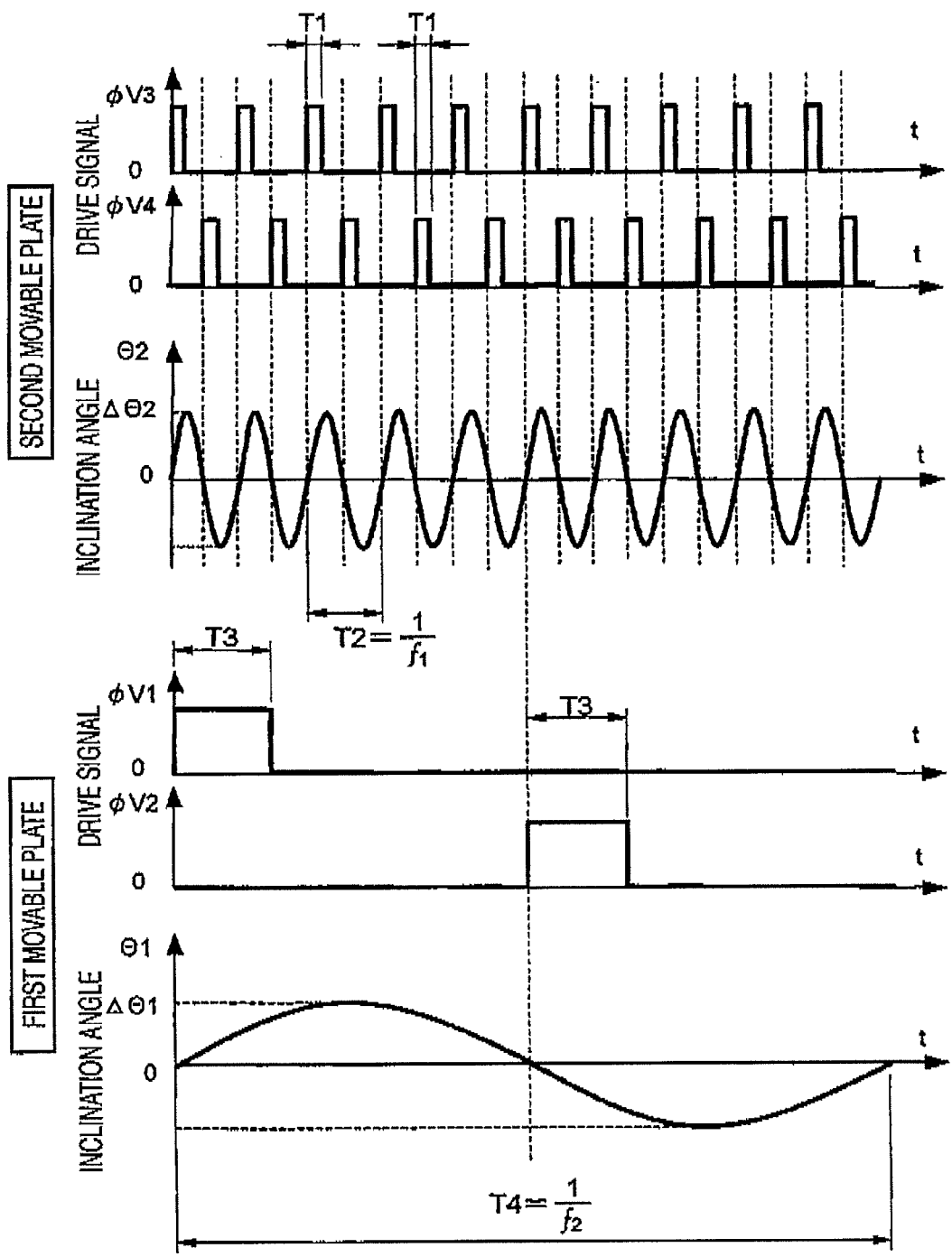
FIG. 10 is a time chart showing a drive signal for driving an optical scanning element and operation realized by this.

FIG. 10 is a time chart showing a drive signal for driving the optical scanning element and operation realized by this.

In the example shown in FIG. 10, the displacement (the inclination angle θ2) of the second movable plate 13 is driven by using a drive signal at a first frequency (f1) determined by the resonant frequency corresponding to the characteristic frequency of the second movable plate 13. Then, the displacement (the inclination angle θ1) of the first movable plate 11 is driven by using a drive signal at a second frequency (f2) lower than the first frequency (f1). As for the resonant frequency, a characteristic frequency is determined by the shape and the mass of the second movable plate 13. Thus, when the driving is performed at this characteristic frequency, i.e., resonant frequency, the rocking operation is stabilized.

In this example, as shown in FIG. 10, four drive signals φV1 to φV4 are applied so as to cause rotational displacement individually in the first movable plate 11 and the second movable plate 13. The drive signals φV3 and φV4 are drive signals for causing rotational displacement in the second movable plate 13. Then, when pulses are applied alternately, the second movable plate 13 is attracted and inclined to one side and another as shown in FIG. 9. Here, the drive signals φV3 and φV4 have the same pulse width T1 and the same frequency with each other. However, their application start timings of the pulses are deviated from each other by a half period. Thus, when the drive signals φV3 and φV4 are applied, the inclination angle θ2 of the second movable plate 13 varies from the initial state to +Δθ2, 0, −Δθ2, . . . in the form of a sine curve having an amplitude of 2Δθ2. The period T2 of the rotational displacement is a period corresponding to the inverse of the second frequency f2.

Further, the drive signals φV1 and φV2 are drive signals for causing rotational displacement in the first movable plate 11. Then, when pulses are applied alternately, the first movable plate 11 is attracted and inclined to one side and another as shown in FIG. 8. Here, the drive signals φV1 and φV2 have the same pulse width T3 and the same frequency with each other. However, their application timings of the pulses are deviated from each other by a half period. Thus, when the drive signals φV1 and φV2 are applied, the inclination angle θ1 of the first movable plate 11 varies from the initial state to +Δθ1, 0, −Δθ1, . . . in the form of a sine curve having an amplitude of 2Δθ1. The period T4 of the rotational displacement is a period corresponding to the inverse of the first frequency f1. Here, in this example, the pulse width T3 of the drive signals φV1 and φV2 is set to be greater than the pulse width of φV3 and φV4, so that the time period of applying the generated electrostatic attractive force is increased. By this, the first movable plate 11 which is a structure larger than the second movable plate 13 can be driven at necessary timing and speed. Here, the period T4 of the first movable plate 11 has a length equal to an integral multiple of the period T2.

When the above-mentioned drive signals φV1 to φV4 are applied, the first movable plate 11 and the second movable plate 13 perform rotational displacement as follows.

In a steady state (stationary state) where the inclination angle θ2 of the second movable plate 13 is 0°, when the drive signal φV3 is switched from a low potential to a high potential, the inclination angle θ2 (see FIG. 9(b)) increases gradually owing to the above-mentioned electrostatic attractive force, and then reaches the maximum Δθ2. Then, after the maximum Δθ2 is reached, when the drive signal φV3 has been switched to a low potential again, the electrostatic attractive force is released. Thus, the elastic restoring forces in the elastic support beams 23A and 23B cause the inclination angle θ2 to return to the state of 0° again.

When the inclination angle θ2 has returned to the state of 0°, the drive signal φV4 is then switched from a low potential to a high potential. Thus, an electrostatic attractive force is generated at a position on the opposite side. Thus, the inclination angle θ2 increases gradually in the negative direction, and then reaches −Δθ2. When the drive signal φV4 has been switched to a low potential again, the electrostatic attractive force is released. Thus, the elastic restoring forces in the elastic support beams 23A and 23B cause the inclination angle θ2 to return to the state of 0° again.

The maximum Δθ2 of the inclination angle θ2 can be adjusted by controlling the high potential voltage value of the drive signals φV3 and φV4 applied on the individual electrodes. When the maximum Δθ2 of the inclination angle θ2 is restricted, the second movable plate 13 can be prevented from contacting with other surrounding members at the time of rotational displacement.

In the case of the first movable plate 11, similarly, in a steady state (stationary state) where the inclination angle θ1 is 0°, when the drive signal φV1 is switched from a low potential to a high potential, the inclination angle θ1 (see FIG. 8(b)) increases gradually owing to the above-mentioned electrostatic attractive force, and then reaches the maximum Δθ1. In this case, the drive signal φV1 is switched to a low potential before the inclination angle θ1 reaches the maximum Δθ1. Then, after the maximum Δθ1 is reached, the elastic restoring forces in the elastic support beams 17A and 17B cause the inclination angle θ1 to return to the state of 0° again.

When the inclination angle θ1 has returned to the state of 0°, the drive signal φV2 is then switched from a low potential to a high potential. Thus, an electrostatic attractive force is generated at a position on the opposite side. Thus, the inclination angle θ1 increases gradually in the negative direction, and then reaches −Δθ1. After the drive signal φV4 has been switched to a low potential again, the electrostatic attractive force is released. Thus, the elastic restoring forces in the elastic support beams 17A and 17B cause the inclination angle θ1 to return to the state of 0° again.

The maximum Δθ1 of the inclination angle θ1 can be adjusted by controlling the high potential voltage value of the drive voltage signals φV1 and φV2 applied on the individual electrodes. When the maximum Δθ1 of the inclination angle θ1 is restricted, the second movable plate 13 can be prevented from contacting with other surrounding members at the time of rotational displacement.

That is, when the first movable plate 11 and the second movable plate 13 transit from one rotational direction to another rotational direction, displacement to the another rotational direction is started before the lower end of the movable plate contacts with a member located beneath at the final displacement position of the one rotational direction. Thus, when the first movable plate 11 and the second movable plate 13 rock individually, rocking is repeated without contacting with other surrounding members. This avoids occurrence of mechanical vibration in association with contact, and hence permits precise control of the direction of orientation of the surface of the micro mirror.

Figure 11:
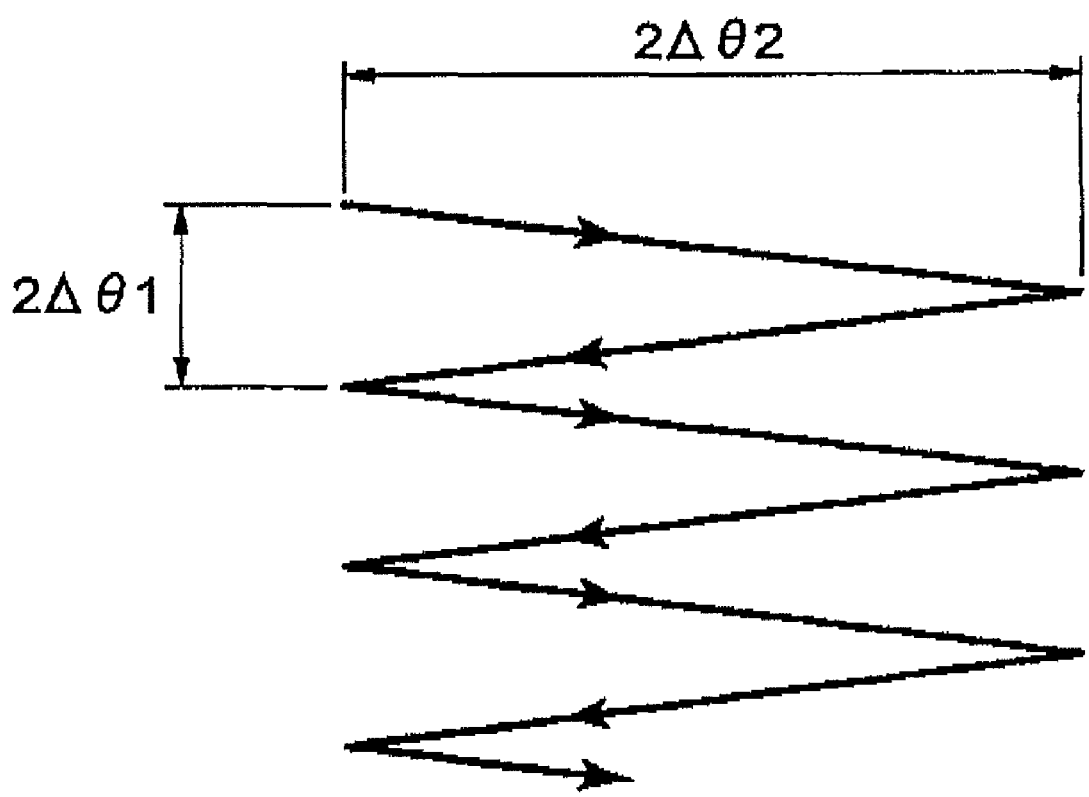
FIG. 11 is a schematic diagram showing a scanning position changed in accordance with drive of an optical scanning element.

When the control shown in FIG. 10 is performed, the first movable plate 11 and the second movable plate 13 of the optical scanning element 100 perform rotational displacement in synchronization with each other. Thus, as for light incident on the micro mirror 29 of the optical scanning element 100, its reflected light is caused to scan sequentially in two-axis direction, for example, as shown in FIG. 11 so that two-dimensional scan is achieved. That is, the second movable plate 13 takes the role of main scanning, while the first movable plate 11 takes the role of sub scanning. As such, the structure on the first movable plate 11 side having a large inertial weight is driven at a low frequency, while the structure on the second movable plate 13 side having a small inertial weight is driven efficiently at a high frequency.

(Second Example of Driving)

Meanwhile, when two-dimensional scan is to be performed in practice for the purpose of image acquisition, a demand is present for improved resolution. Thus, in order that two-dimensional scan of one frame should be completed in a short time, improving of the speed of main scanning is advantageous. Thus, an example is described below in which the second movable plate 13 is driven at a frequency still higher than the resonant frequency specific to the structure of the second movable plate 13.

Figure 12:
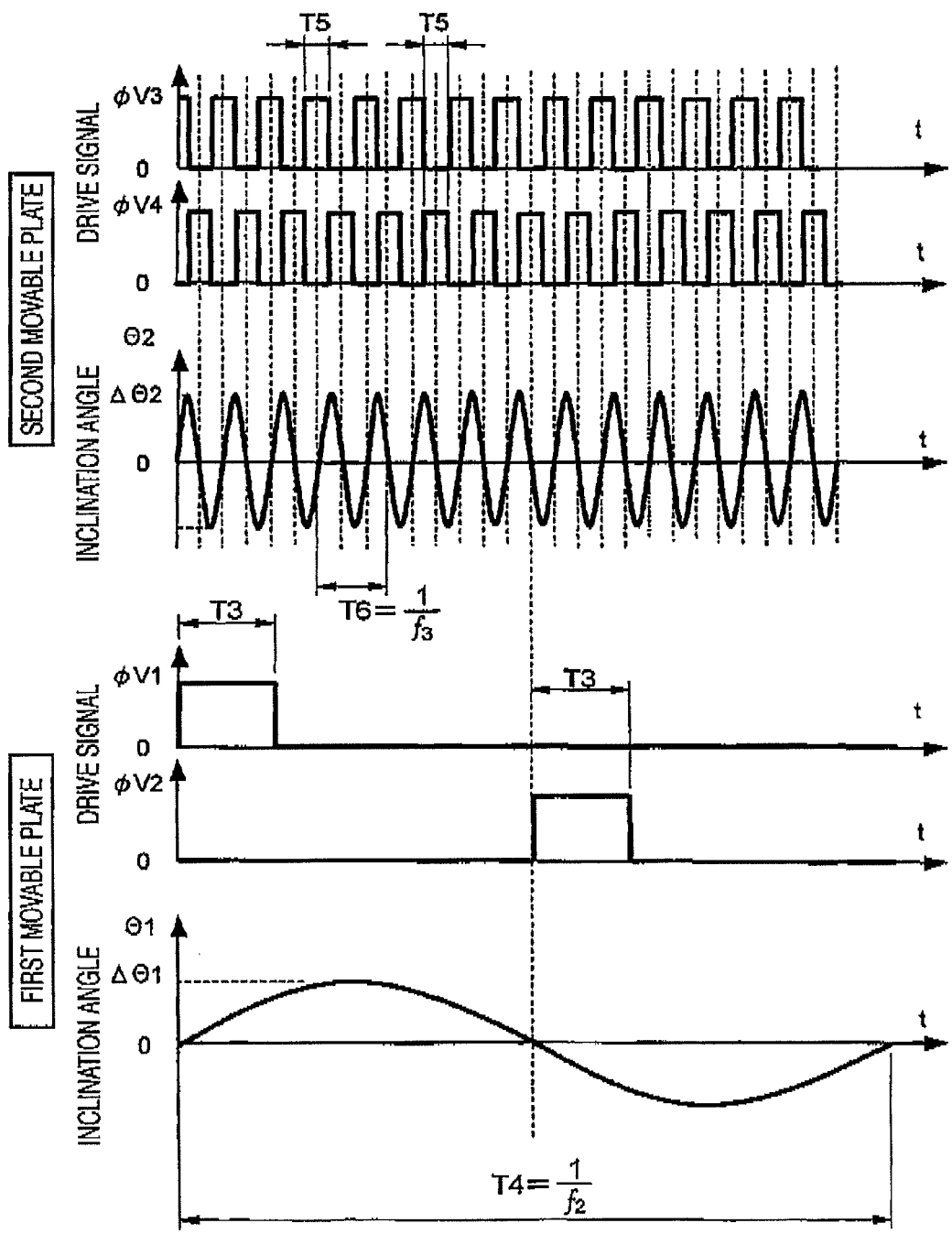
FIG. 12 is a time chart showing a drive signal for driving an optical scanning element and operation realized by this.

FIG. 12 is a time chart showing a drive signal for driving the optical scanning element and operation realized by this.

In the example shown in FIG. 12, it is assumed that the first movable plate 11 is driven at the above-mentioned second frequency (f2) and that the second movable plate 13 is driven by using a drive signal at a frequency (f3) higher than the above-mentioned first frequency (f1) which is the resonant frequency. The driving of the first movable plate 11 is similar to the example in FIG. 10 described above, and hence description is omitted.

Also in this example, as shown in FIG. 12, four drive signals φV1 to φV4 are applied so as to cause rotational displacement individually in the first movable plate 11 and the second movable plate 13. The drive signals φV3 and φV4 are drive signals in which when pulses having a pulse width T5 are applied alternately, the second movable plate 13 is attracted and inclined to one side and another as shown in FIG. 9. Here, the drive signals φV3 and φV4 have the same pulse width T5 and the same frequency with each other. However, their application start timings of the pulses are deviated from each other by a half period. Thus, when the drive signals φV3 and φV4 are applied, the inclination angle θ2 of the second movable plate 13 varies in the form of a sine curve similar to that described above. The period T6 of the rotational displacement is a period corresponding to the inverse of the third frequency f3. In this case, driving need be performed at an oscillation frequency higher than the resonant frequency. Thus, even when the second movable plate 13 is moving in a direction that the inclination angle θ2 of the second movable plate 13 returns to the zero position, the moving need be accelerated forcedly by applying a force. As a result of such control, the period T6 for the change of the inclination angle θ2 becomes shorter than the period of the resonant frequency determined by the characteristic frequency of the second movable plate 13 and the like. Here, the drive signals φV1 and φV2 are similar to those shown in FIG. 10, and hence description is omitted.

When the above-mentioned drive signals φV1 to φV4 are applied, the first movable plate 11 and the second movable plate 13 perform rotational displacement basically in a similar manner to the above-mentioned case. However, in particular, the second movable plate 13 is driven at the third frequency higher than the first frequency (f1) determined by the resonant frequency specific to the second movable plate 13. Thus, in a manner that the displacement (the inclination angle θ2) of the second movable plate 13 varies with a short period, the reflected light from the micro mirror is caused to scan, so that the operation speed is enhanced. This reduces the scanning period for one frame in the two-dimensional scan, and hence permits high speed image acquisition and the like. Further, since the second movable plate 13 is moved forcedly, element design flexibility is improved regardless of the resonant frequency.

(Third Example of Driving)

On the other hand, in some cases depending on the application, the optical scanning element 100 is scanned at a relatively slow speed. In such a case, the second movable plate 13 is driven at a frequency lower than the resonant frequency of the second movable plate 13. Here, an example is described below in which the second movable plate 13 is driven at a fourth frequency lower than the resonant frequency specific to the structure of the second movable plate 13.

Figure 13:
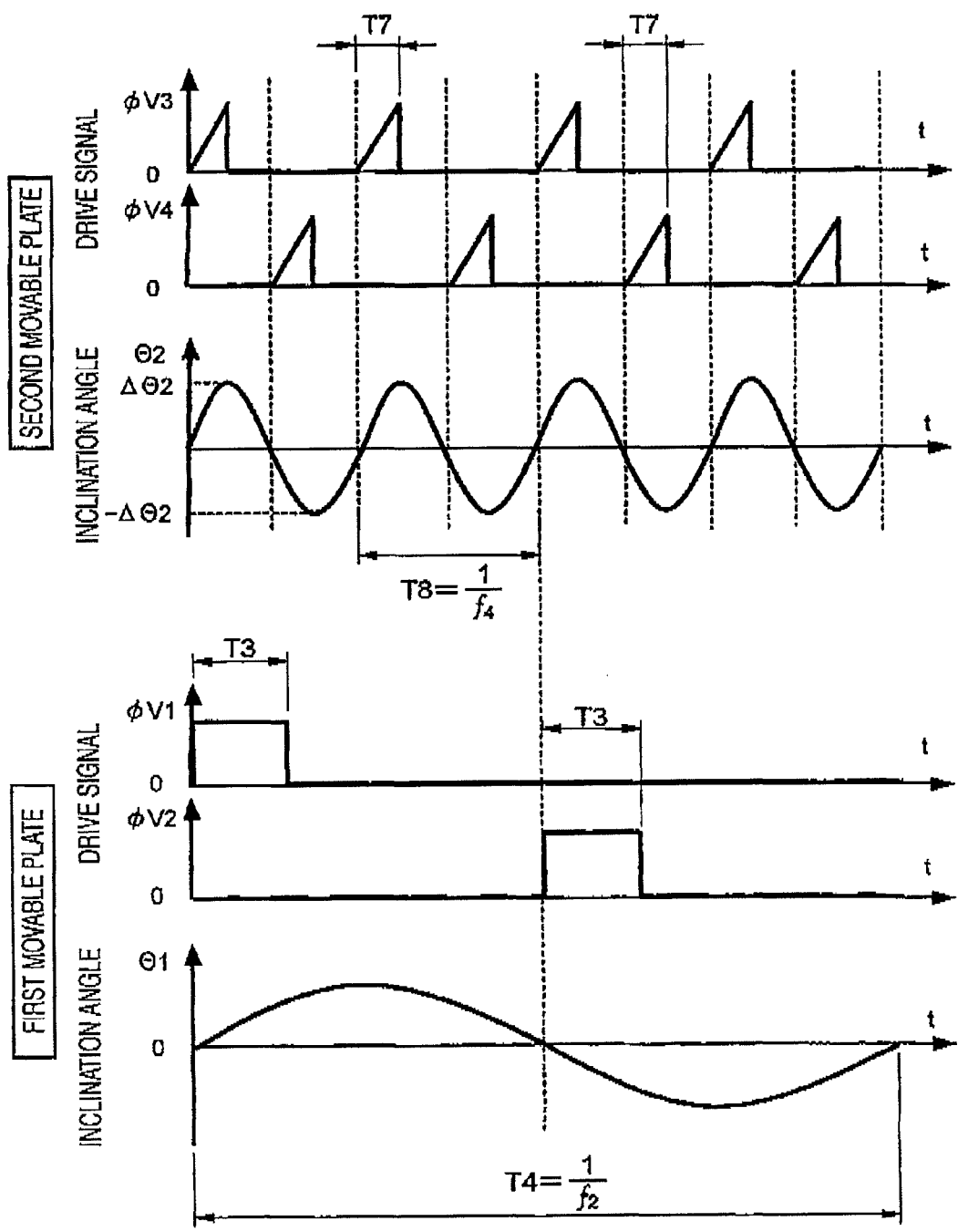
FIG. 13 is a time chart showing a drive signal for driving an optical scanning element and operation realized by this.

FIG. 13 is a time chart showing a drive signal for driving the optical scanning element and operation realized by this.

In the example shown in FIG. 13, it is assumed that the first movable plate 11 is driven at the above-mentioned second frequency (f2) and that the second movable plate 13 is driven by using a drive signal at a fourth frequency (f4) lower than the above-mentioned first frequency (f1) which is the resonant frequency. The driving of the first movable plate 11 is similar to the example in FIG. 10 described above, and hence description is omitted.

In the example shown in FIG. 13, employed drive signals φV3 and φV4 have a signal waveform like a saw tooth wave provided with a slope in which the potential goes up with a fixed inclination as time proceeds. When such a signal waveform is employed, the second movable plate 13 can be driven at a speed lower than the speed of the first frequency (f1) which is the above-mentioned resonant frequency.

That is, in a steady state (stationary state) where the inclination angle θ2 is 0, when the drive signal φV3 is gradually increased from a low potential toward a high potential, the above-mentioned electrostatic attractive force increases gradually. Thus, the rise of the change of the inclination angle θ2 (see FIG. 9(a)) becomes gradual. At the time that the inclination angle θ2 has reached the maximum Δθ2, when the drive signal φV3 is switched to a low potential, the electrostatic attractive force is released. Thus, in accordance with a physical force relationship between inertial forces, elastic restoring forces, and the like in the elastic support beams 23A and 23B, change occurs such that the state of inclination angle 0° is brought again.

After the return to the state where the inclination angle θ2 is 0°, the drive signal φV4 then increases gradually from a low potential toward a high potential. Thus, an electrostatic attractive force directing to a position on the opposite side increases gradually, and hence the inclination angle θ2 varies slowly in the negative direction. Then, at the time that the inclination angle θ2 has reached the maximum −Δθ2 on the negative side, when the drive signal φV4 is switched from a high potential to a low potential, the electrostatic attractive force is released. Thus, in accordance with a physical force relationship between inertial forces, elastic restoring forces, and the like in the elastic support beams 23A and 23B, change occurs such that the state of inclination angle 0° is brought. As a result, the rotational displacement of the second movable plate 13 is performed with the period T8.

As described above, the area of the saw tooth wave of the drive signal φV4 corresponds to the energy of driving the second movable plate 13. Thus, when the wave shape is changed appropriately, desired operation is achieved in the second movable plate 13.

Here, in the second and the third examples of driving described above, the first movable plate 11 has been driven at a frequency lower than the resonant frequency of the second movable plate 13. However, the present invention is not limited to this. That is, the first movable plate 11 may be oscillated at a frequency approximately equal to the resonant frequency of the structure integrated with the first movable plate 11. In this case, driving is performed such that the first movable plate rocks at a resonant frequency corresponding to the characteristic frequency determined by the shape, the mass, and the like of the structure integrated with the first movable plate 11, that is, the structure including the second movable plate 13. This permits driving with a necessary minimum driving force, and hence stabilizes the rocking operation.

Second Embodiment

Next, a second exemplary embodiment of the optical scanning element according to the present invention is described below. In the optical scanning element of the present embodiment, the second movable plate is enlarged further.

Figure 14:
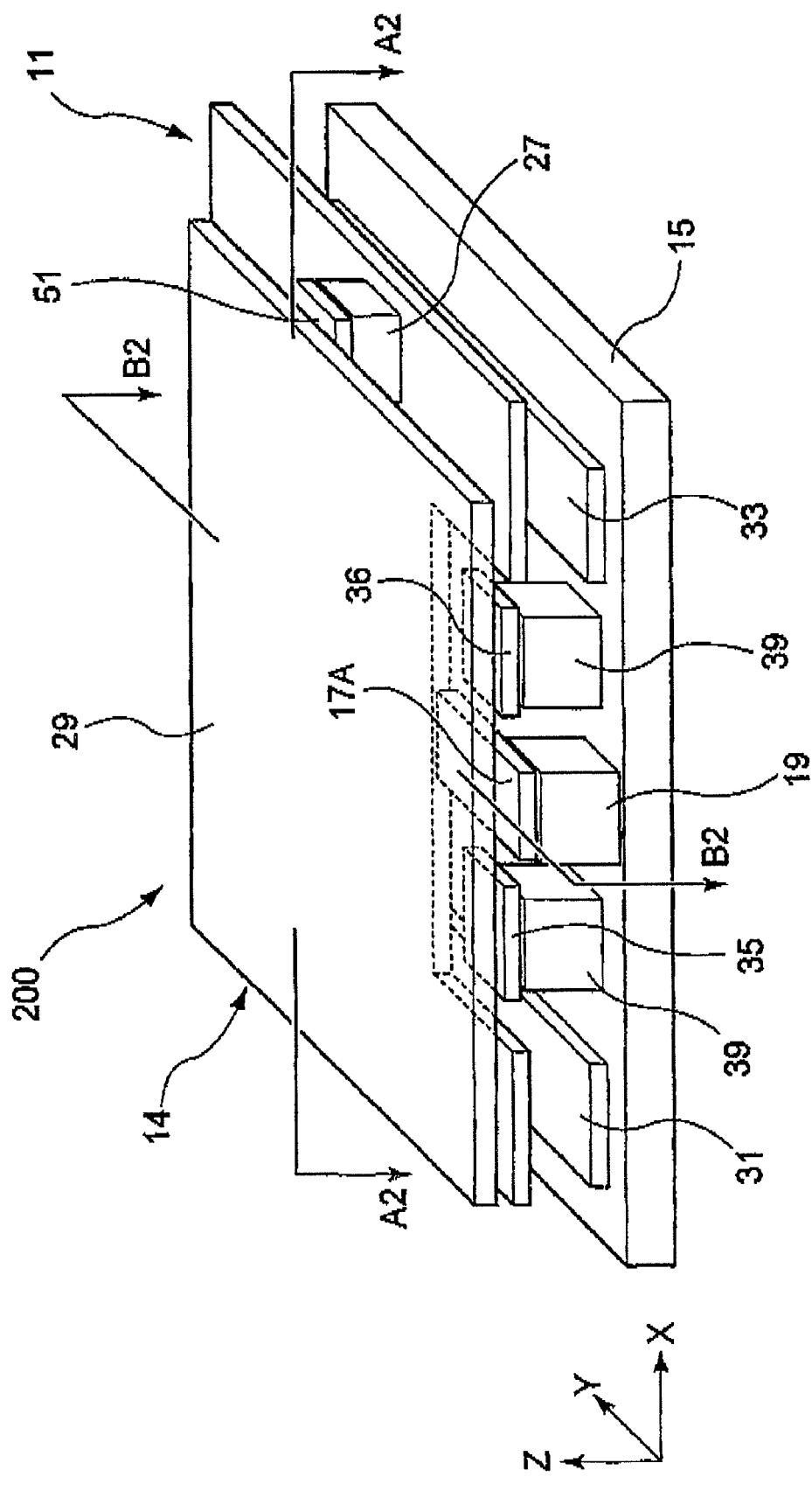
FIG. 14 is a perspective view showing a basic structure of an optical scanning element according to a second exemplary embodiment.
Figure 15:
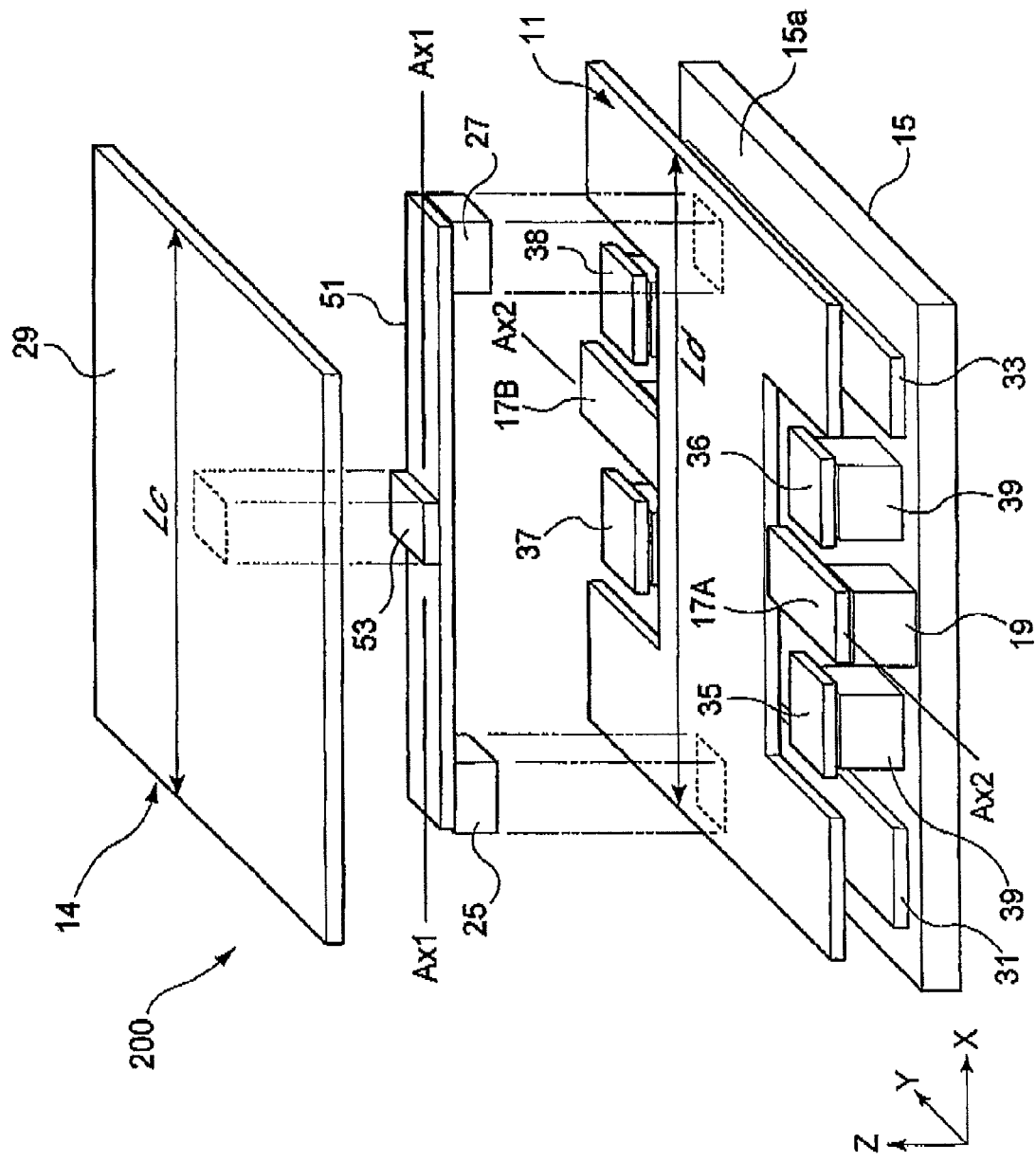
FIG. 15 is a partly exploded perspective view of an optical scanning element shown in FIG. 14.
Figure 16:
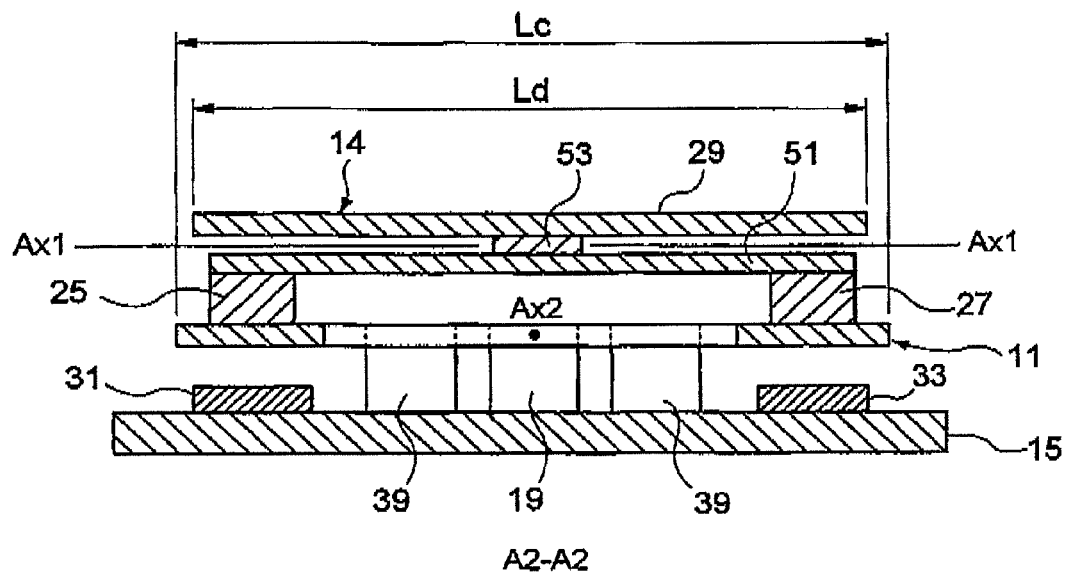
FIG. 16 is a longitudinal sectional view taken along line A2-A2 in FIG. 14.
Figure 17:
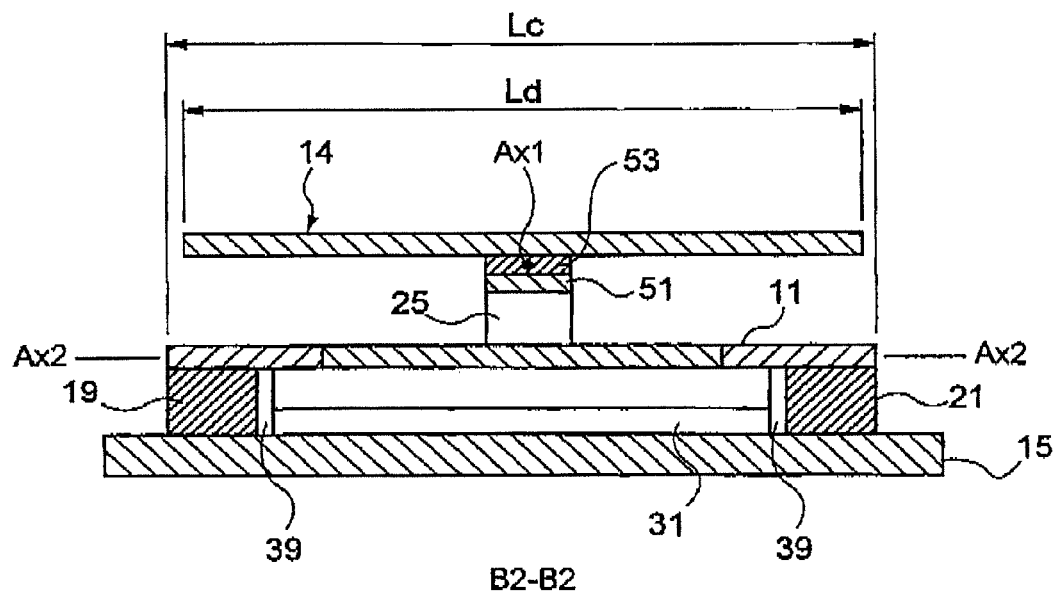
FIG. 17 is a longitudinal sectional view taken along line B2-B2 in FIG. 14.

FIG. 14 is a perspective view showing a basic structure of an optical scanning element according to a second embodiment. FIG. 15 is a partly exploded perspective view of the optical scanning element shown in FIG. 14. Further, FIG. 16 is a longitudinal sectional view taken along line A2-A2 in FIG. 14. FIG. 17 is a longitudinal sectional view taken along line B2-B2 in FIG. 14. Here, in FIGS. 14 to 17, elements corresponding to those in the structure according to the first embodiment are designated by like numerals.

As shown in FIG. 14, in this optical scanning element 200, on a first flat plate-shaped movable plate (a first movable section) 11, a second movable plate (a second movable section) 14 is arranged and extends in the X-direction in the figure. In the optical scanning element 200 of the present embodiment, the mode of support for the second movable plate 14 is changed so that the size of the second movable plate 14 is enlarged.

As shown in FIG. 15, the second support parts 25 and 27 are arranged on the first movable plate 11 similarly to the first embodiment described above. However, the difference is that an elastic support beam 51 is provided such as to extend above the second support parts 25 and 27 and that a joint part 53 protruding upward in the center part of the elastic support beam 51 joins and supports the second movable plate 14. That is, the second movable plate 14 is connected, within a region overlapping in the thickness direction, to the elastic support beam 51 serving as a support member in a manner permitting elastic displacement relative to the second movable plate 14. The elastic support beam 51 is formed from a long and thin plate-shaped elastic material extending in the X-direction and having a length approximately equal to the distance from one end to the other end of the first movable plate 11. The elastic support beam 51 forms a twist beam.

By the above-mentioned configuration, the elastic support beam 51 can perform rotational displacement about the axis Ax1. Further, the second movable plate 14 joined by the joint part 53 of the elastic support beam 51 is supported in a state permitting rotational displacement about the axis Ax1. On the upper surface of the second movable plate 14, a micro mirror 29 serving as a light reflecting surface is formed in a manner of covering the entire surface.

Here, the size of the micro mirror 29 of the second movable plate 14 in the Y-direction is similar to that of the first embodiment. That is, the maximum dimension La of the first movable plate 11 is almost equal to the maximum dimension Lb of the second movable plate 14 and the micro mirror 29. As for the X-direction, as shown in FIG. 16, the maximum dimension Lc of the first movable plate 11 in the X-direction is almost equal to the maximum dimension Ld of the second movable plate 14 and the micro mirror 29 in the X-direction.

That is, the first support parts 19 and 21 and the second fixed electrodes 35, 36, 37, and 38 are arranged in concave regions where the width of the first movable plate 11 in the Y-direction is narrow. Thus, when the entire optical scanning element 200 is viewed from the above in the Z-direction, the first support parts 19 and 21 and the second fixed electrodes 35, 36, 37, and 38 are hidden under the second movable plate 14. That is, they overlap with each other in the thickness direction. Further, the second support parts 25 and 27 and the elastic support beam 51 are similarly hidden under the second movable plate 14. Thus, when the entire optical scanning element 200 is viewed from the above in the Z-direction, the first support parts 19 and 21, the second fixed electrodes 35, 36, 37, and 38, the second support parts 25 and 27, and the elastic support beam 51 are hidden by the surface of the second movable plate 13. As a result, the micro mirror 29 of the second movable plate 13 is enlarged into a size close to the plan size of the entire optical scanning element 200. That is, the first fixed electrodes 31 and 33 and the second fixed electrodes 35, 36, 37, and 38 are arranged in a manner of overlapping with the second movable plate in the thickness direction (up and down directions) 14. Thus, they, include the elastic support beam 51, do not extend to the outside of the surface of the micro mirror provided in the second movable plate 14. Accordingly, the aperture ratio which is the ratio of the area of the micro mirror 29 to the area of the entire optical scanning element 200 becomes further higher even in comparison with the optical scanning element 100 of the first embodiment.

Here, the operation of driving the first movable plate 11 and the second movable plate 14 of the optical scanning element 200 is similar to that of the first embodiment, and hence description is omitted.

Third Embodiment

Next, a third exemplary embodiment of the optical scanning element according to the present invention is described below. The optical scanning element of the present embodiment has a configuration that the electrode-to-electrode distance between the second movable plate and the second fixed electrode is reduced.

Figure 18:
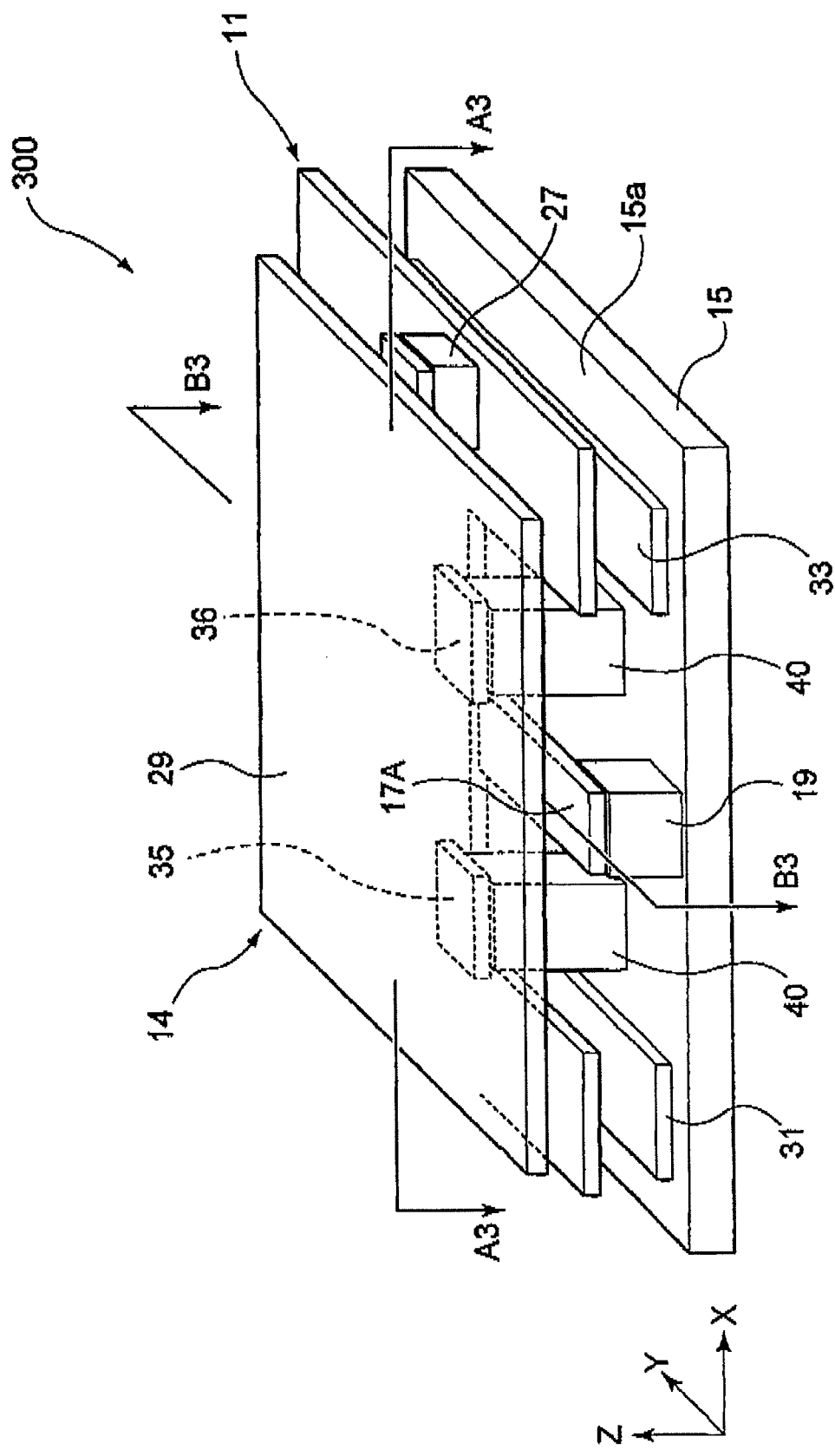
FIG. 18 is a perspective view showing a basic structure of an optical scanning element according to a third exemplary embodiment.
Figure 19:
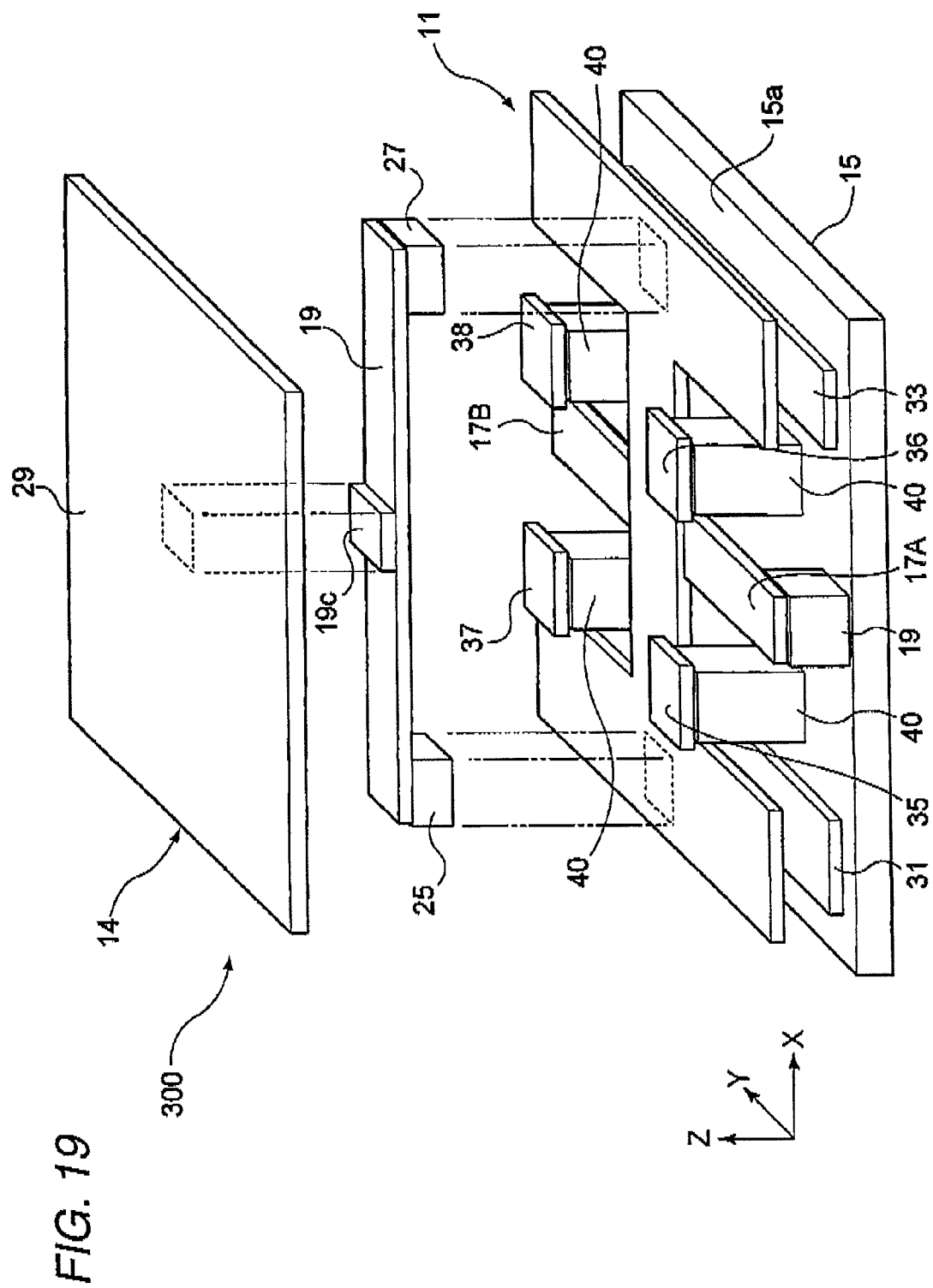
FIG. 19 is a partly exploded perspective view of an optical scanning element shown in FIG. 18.
Figure 20:
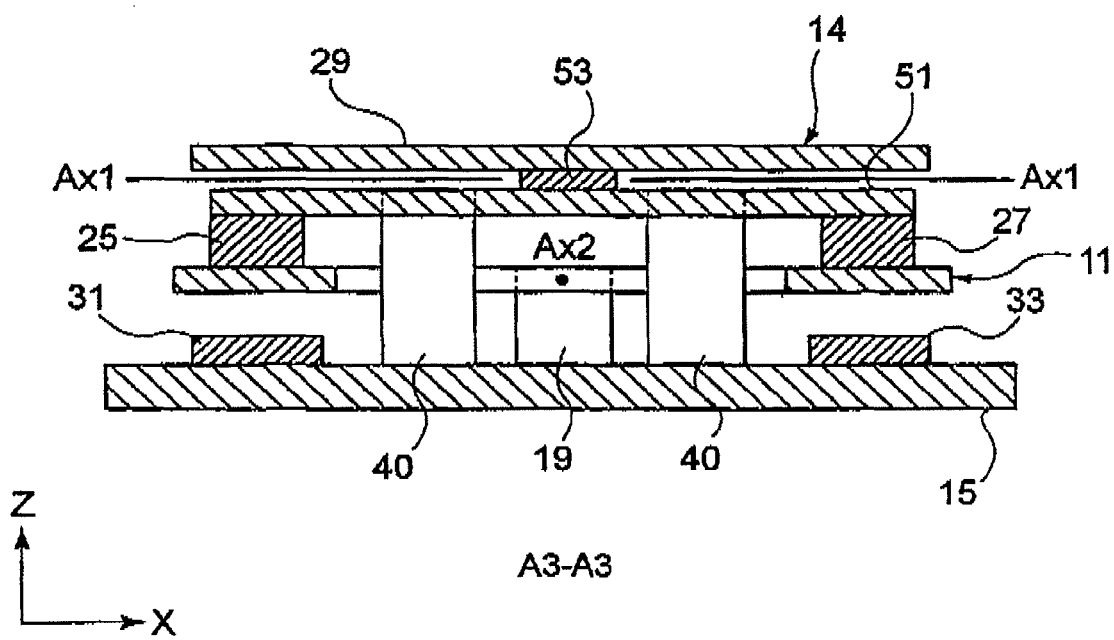
FIG. 20 is a longitudinal sectional view taken along line A3-A3 in FIG. 18.
Figure 21:
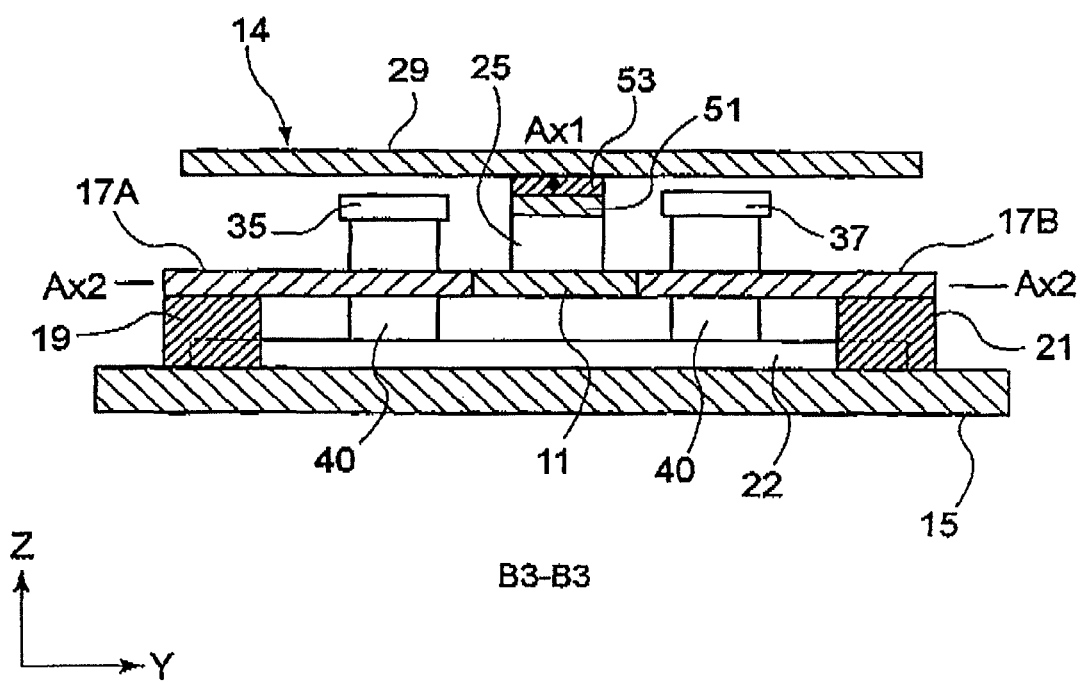
FIG. 21 is a longitudinal sectional view taken along line B3-B3 in FIG. 18.

FIG. 18 is a perspective view showing a basic structure of an optical scanning element according to a third embodiment. FIG. 19 is a partly exploded perspective view of the optical scanning element shown in FIG. 18. Further, FIG. 20 is a longitudinal sectional view taken along line A3-A3 in FIG. 18. FIG. 21 is a longitudinal sectional view taken along line B3-B3 in FIG. 18. Here, in FIGS. 18 to 21, elements corresponding to those in the structure according to the first and the second embodiments are designated by like numerals.

In comparison with the configuration of the above-mentioned optical scanning element 200, as shown in FIGS. 18 and 19, an optical scanning element 300 has the same major configuration concerning the second movable plate 13 and the like. However, the configuration is different concerning support beds arranged on the substrate 15 and having the second fixed electrodes 35, 36, 37, and 38 on top and concerning the shape of the first movable plate 11.

The support beds 40 are installed vertically on the upper surface 15a of the substrate 15 and have the second fixed electrodes 35, 36, 37, and 38 on each top. As shown in FIGS. 20 and 21, the height of the second fixed electrodes 35, 36, 37, and 38 is at a height position between the first movable plate 11 and the second movable plate 14, that is, approximately equal to the height of the elastic support beam 51. Thus, the height is protruding from the installation surface height of the first movable plate 11. Then, the distance between the second fixed electrodes 35 to 37 extending above the first movable plate 11, similarly, the distance between the second fixed electrodes 36 to 38, is shorter than the second embodiment described above. This is achieved by reducing further the width of the concave region where the width of the first movable plate 11 in the Y-direction is narrow. That is, the distance between the rotational axis Ax2 of the second movable plate 14 and the second fixed electrodes 35, 36, 37, and 38 is reduced.

Since the electrode-to-electrode distance between the second movable plate 14 and the second fixed electrodes 35, 36, 37, and 38 is reduced, when the same potential difference is applied, a greater electrostatic force is generated. Thus, application of a lower voltage is sufficient, and hence voltage reduction is achieved. Further, the distance between the second fixed electrodes 35, 36, 37, and 38 and the rotational axis Ax2 is reduced, the scanning angle of the second movable plate 14 can be increased. Thus, wide range scan is realized with a low power.

Next, a manufacturing process for the optical scanning element having the above-mentioned configuration is described below. Here, a detailed example of a manufacturing process is described for a case that an element corresponding to the optical scanning element 200 described in the second embodiment described above is manufactured.

Figure 22:
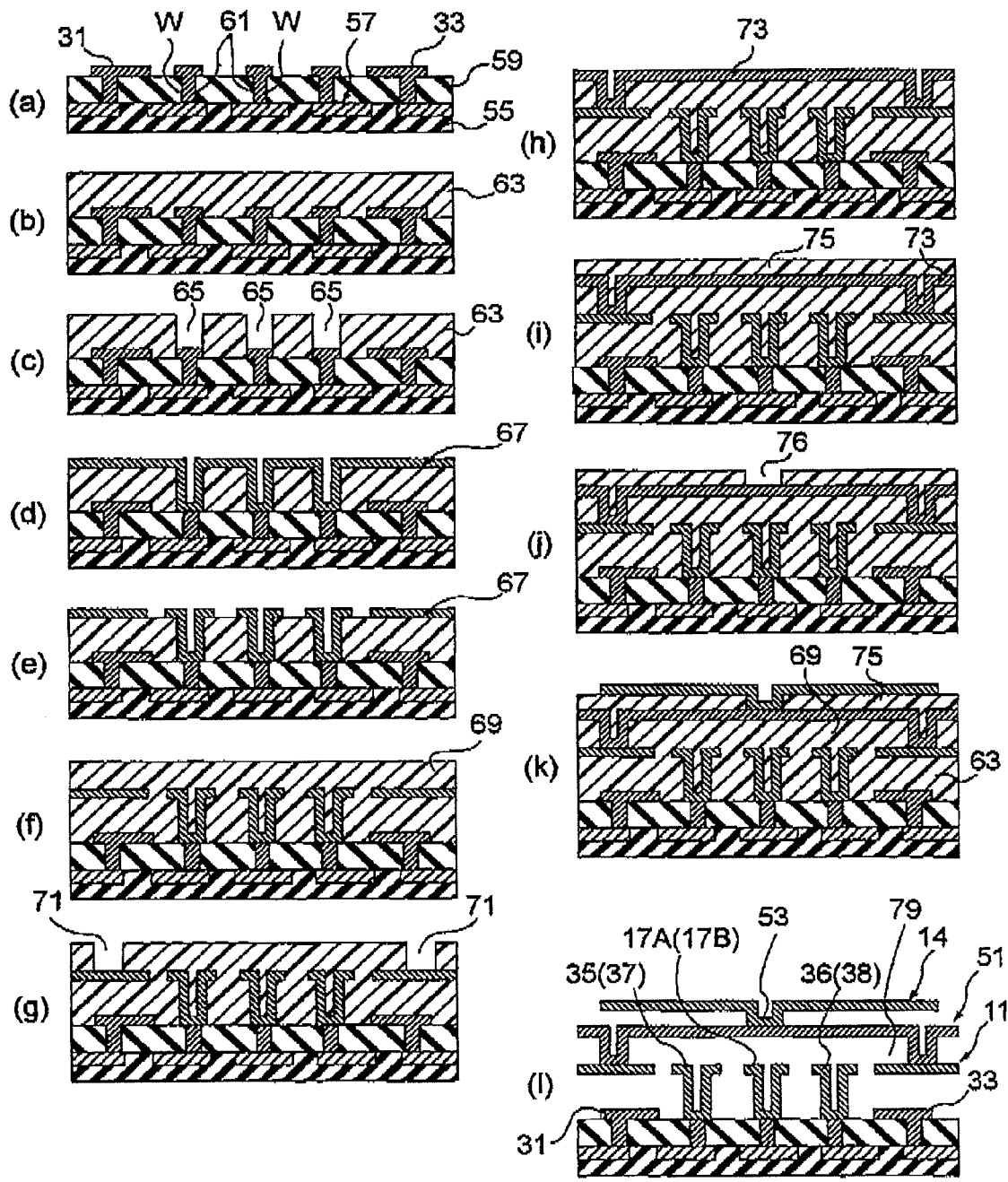
FIG. 22 is an explanation diagram showing individual stages of manufacturing processes (a) to (l) for an optical scanning element.

FIG. 22 is an explanation diagram showing individual stages of the manufacturing processes (a) to (l) for the optical scanning element. Here, the state of each process step shown in FIG. 22 corresponds to the structure on the front side of the optical scanning element 200 shown in FIG. 14 (the shallower side in the Y-direction).

As shown in FIG. 22(a), first, a drive circuit 57 composed of CMOS is formed on a first insulating layer 55 formed on an SOI (Si on Insulator) substrate.

Next, a $SiO_2$ film is formed on the drive circuit 57 by PECVD so that a second insulating layer 59 is formed. Then, contact holes 61 for connecting the output of the drive circuit 57 to the individual electrodes of the element are patterned and formed by photolithography and fluorine-family RIE etching.

After that, a foundation TiN thin film (not shown) is formed by spattering. Then, a tungsten W film is formed by spattering. As a result, tungsten W is embedded into the contact holes 61. After that, the surface is flattened by CMP. Then, a second insulator layer (not shown) is formed such as to cover the flat surface in which the contact holes 61 are filled with tungsten W.

On the second insulator layer, a film for the first fixed electrodes 31 and 33, an under-layer film for the second fixed electrodes (35, 36, 37, 38), and an Al film (preferably, an Al alloy containing a high melting point metal) serving as an under-layer film for the first common electrode (the first movable plate 11) are formed by spattering. Then, patterning into desired electrode shapes is performed by photolithography and chlorine-family RIE etching, so that a film of the first fixed electrodes 31 and 33, an under-layer film of the second fixed electrodes, and an under-layer film of the first common electrode are formed. Here, at that time, the film of the first fixed electrodes 31 and 33, the under-layer film of the second fixed electrodes, and the under-layer film of the first common electrode are respectively connected to the output of the drive circuit 57 via the contact holes 61, and hence can receive appropriate potentials.

Then, as shown in FIG. 22(b), a positive resist film 63 is applied as a sacrifice layer, and then hard baking is performed. The hard baking is performed at a temperature exceeding 200° under Deep UV irradiation. By this, the shape is maintained even in high temperature processes at subsequent process steps. Further, insolubility to resist removing solvents is obtained. When a resist is applied and film-formed, the resist surface becomes flat regardless of the level difference in the foundation film. This resist layer serves as a sacrifice layer, and hence removed at a process step described later. Thus, the film thickness of the resist film 63 after the hard baking determines the gap between the lower electrode and the support part or the movable section in the future.

Then, as shown in FIG. 22(c), locations corresponding to the second fixed electrodes 35, 36, 37, and 38 and the first common electrode are patterned by photolithography so that contact holes 65 are formed.

Then, as shown in FIG. 22(d), an electrically conductive film 67 composed of Al (preferably, an Al alloy containing a high melting point metal) that constitutes the film of the first movable plate 11, the second fixed electrodes 35, 36, 37, and 38, and the first common electrode is formed by spattering.

Then, as shown in FIG. 22(e), in the electrically conductive film 67, locations corresponding to the film of the first movable plate 11, the second fixed electrodes 35, 36, 37, and 38, and the first common electrode are patterned by photolithography using a positive resist and fluorine-family RIE etching. After that, the resist is removed by oxygen-family plasma etching (ashing).

Then, as shown in FIG. 22(f), a positive resist film 69 is applied again as a sacrifice layer, and then hard baking is performed. The film thickness of the resist film 69 after the hard baking determines the gap between the first future movable plate 11, the second fixed electrodes 35, 36, 37, and 38, and the first common electrode and the support parts (the second common electrodes) for the second movable plate 13 in the future.

Then, as shown in FIG. 22(g), locations corresponding to the second common electrodes are patterned by photolithography so that contact holes 71 are formed.

Next, as shown in FIG. 22(h), an electrically conductive film 73 composed of Al (preferably, an Al alloy containing a high melting point metal) that constitutes the second common electrodes (the support parts for the second movable plate 13) is formed by spattering. Then, patterning is performed by photolithography using a positive resist and by fluorine-family RIE etching. After that, the resist is removed by oxygen-family plasma etching (ashing).

Then, as shown in FIG. 22(i), a positive resist film 75 is applied again as a sacrifice layer, and then hard baking is performed. The film thickness of the resist film 75 after the hard baking determines the gap between the second common electrodes (the support parts for the second movable film) and the second movable film in the future.

Further, as shown in FIG. 22(j), a location corresponding to the supporting rod of the second movable plate 13 is patterned by photolithography so that a contact hole 76 is formed.

Then, as shown in FIG. 22(k), an electrically conductive film 77 composed of Al (preferably, an Al alloy containing a high melting point metal) that constitutes the second movable plate 13 is formed by spattering. Then, patterning is performed by photolithography using a positive resist and by fluorine-family RIE etching. After that, the resist is removed by oxygen-family plasma etching (ashing).

Then, as shown in FIG. 22(l), the resist layers 63, 69, and 75 serving as sacrifice layers are removed by oxygen-family and/or fluorine-family plasma etching (ashing), so that a gap 79 is formed. As a result, an optical scanning element having a desired structure is formed.

Here, the materials and the manufacturing method described above are examples. That is, arbitrary materials and manufacturing methods may be employed within the scope of the present invention.

Fourth Embodiment

Next, an example is described in which an optical scanning element according to the present invention is applied in an optical element of an endoscope device.

In this embodiment, a detailed example in which an optical scanning element having the above-mentioned configuration is adopted in an endoscope device is described below with reference to FIGS. 23 to 28.

Figure 23:
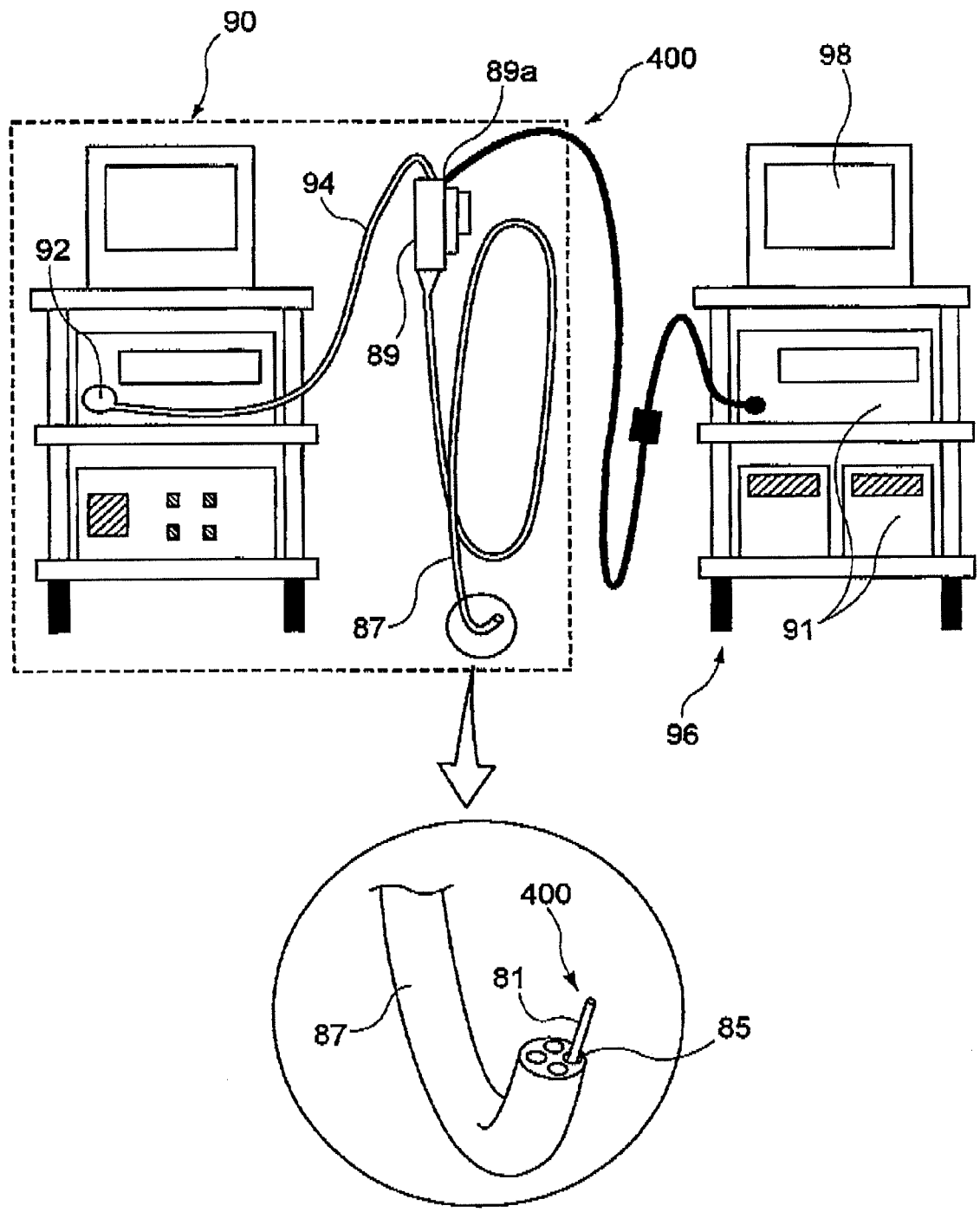
FIG. 23 is a front view showing a configuration of an entire endoscope device employing an optical scanning probe on which an optical scanning element is mounted.

FIG. 23 is a front view showing the configuration of: an optical scanning probe device containing an optical scanning probe employing the optical scanning element; and an entire endoscope device.

In the optical scanning probe 400, a tip part is inserted into a test subject. Then, a region in the test subject is irradiated with light with scanning. When light emitted from the irradiation point is detected, the inside of the test subject is observed. The optical scanning probe 400 is covered by a thin and long sheath 81 having flexibility.

The base end side of the scope 94 is connected to a connection section 92 of the endoscope device 90. Further, an operation section 89 is connected to the other end side of the scope 94. Then, a thin and long insert part 87 is connected to the tip of the operation section 89. An insert port 89a for forceps is provided in the operation section 89. Then, the probe is inserted through the insert port 89a. The probe extends to the tip of the insert part 87 through a forceps port 85 formed in the insert part 89a.

Then, an optical scanning probe device 96 has: the optical scanning probe 400; a signal processor 91 for calculating distribution information of light emitted from one-dimensional or two-dimensional irradiation points in a test subject on the basis of reflected light guided through an optical fiber 101 of the optical scanning probe 400 and a drive signal of a scanning drive section 105; and a display section 98 for displaying a video signal outputted from the signal processor 91. Thus, by using the optical scanning probe 400 having a simple structure, high speed optical scanning is performed with a low voltage. Then, an electric signal obtained from the intensity of light emitted from the irradiation point is inputted to the signal processor 91, so that distribution information of light emitted from the irradiation point can be displayed on the display section 98 with high response.

Figure 24:
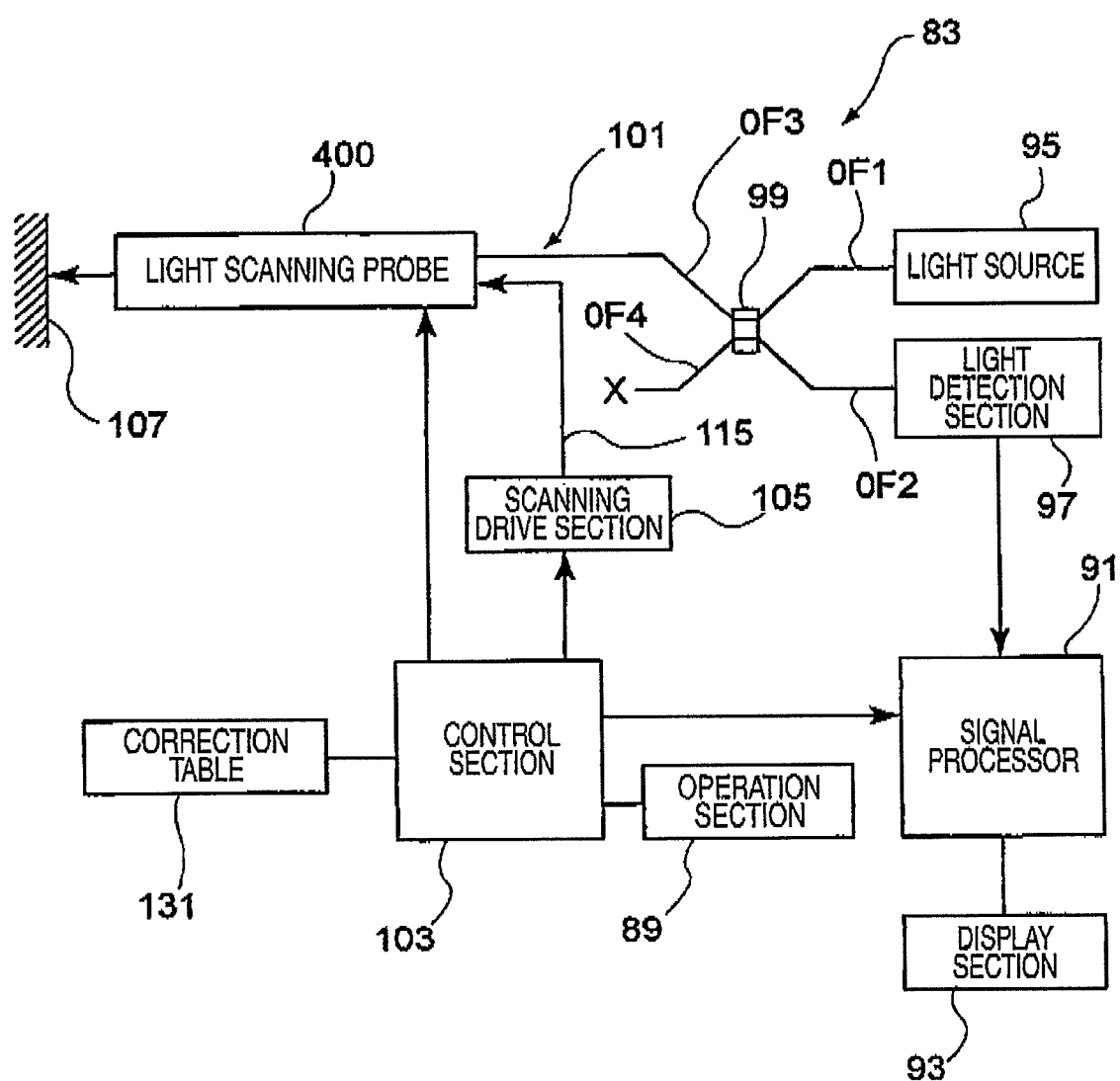
FIG. 24 is a block diagram showing a configuration of an endoscope.

FIG. 24 is a block diagram showing the configuration of the endoscope.

The endoscope 83 has: an optical system for inputting and outputting optical information to the optical scanning probe 400; and a driving system for inputting drive controlling information. Then, information is inputted and outputted from the two systems, so that an observed image is outputted to the display section 93 via the signal processor 91.

The optical system has: a light source 95 composed of a semiconductor laser or the like; a light detection section 97; an optical coupler 99; and an optical fiber 101 serving as light transmitting means (and reflected light transmitting means) for connecting these. The driving system has: an operation section 89; a control section 103 connected to this; a scanning drive section 105; and a correction table 131 (all of these are described later in detail).

After light intensity adjustment is performed by appropriate light intensity controlling means, laser light emitted from the light source 95 is guided to a first optical fiber OF1, and then branched to a third optical fiber OF3 and a fourth optical fiber OF4 by the optical coupler 99 having four inputs and outputs. Through the third optical fiber OF3, laser light generated by combining visible laser beams is transmitted to the optical scanning probe 400. Then, when scan is performed by a later-described objective unit built in the tip part of the optical scanning probe 400, so that observation light (observation beam) is scanned and the light is focused on an observation point near the surface of a test subject 107.

On the other hand, reflected light from the scanning position of the test subject 107 to be detected returns to the optical scanning probe 400, and is then guided through the optical fiber 101 to the optical coupler 99. Then, light branched to the second optical fiber OF2 by the optical coupler 99 is detected by the light detection section 97. The light detection section 97 is a device like a photoelectric transducer for outputting the intensity of incident light as an electric signal. The electric signal outputted from the light detection section 97 is inputted to the signal processor 91 and then displayed on the display section 93.

Here, in order that light branched to the fourth optical fiber OF4 should be prevented from being reflected at the end and then returning to the optical coupler 99 side, closing or non-reflective processing is performed on the end of the fourth optical fiber OF4. The first optical fiber OF1, the second optical fiber OF2, the third optical fiber OF3, and the fourth optical fiber OF4 may preferably be, for example: single mode fibers; and low-order multimode fibers or polarization preservation fibers capable of maintaining sufficient coherence property.

Then, the control section 103 controls various kinds of operation of: causing the scanning drive section 105 to generate a drive signal for performing optical scan in the objective unit; outputting the drive signal to the signal processor 91 so as to perform image formation; freezing operation for an acquired image and hard copying of a still image in response to the operation signal from the operation section 89; and bending of the optical scanning probe 400.

Figure 25:
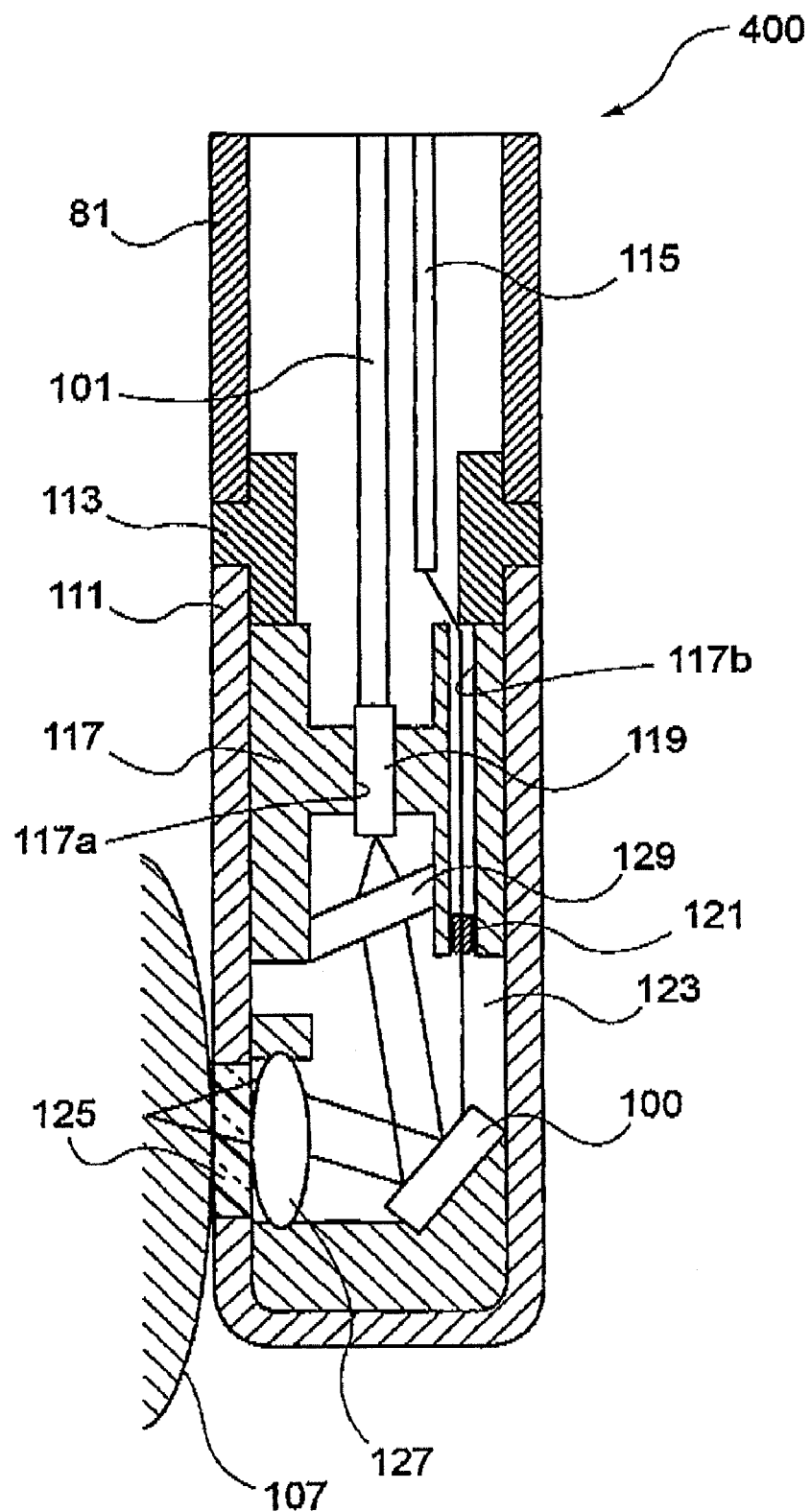
FIG. 25 is a sectional view showing a structure of a tip part of an optical scanning probe.

FIG. 25 is a sectional view showing the structure of the tip part of the optical scanning probe 400.

In the optical scanning probe 400, a tip frame 111 is connected to the tip of the sheath 81 via a linkage part 113 having a ring shape. Then, the optical fiber 101 and a signal line 115 inserted into the sheath 81 are connected to the tip frame 111 side. The tip frame 111 has a structure of a cylindrical shape whose tip part is closed.

In the inside of the tip frame 111, a holding member 117 is held that has an outer diameter approximately equal to the inner diameter of the tip frame 111. The holding member 117 has communicating holes 117a and 117b through which the optical fiber 101 and the signal line 115 are inserted. In the communicating hole 117a, a ferrule 119 provided at the tip of the optical fiber 101 is arranged. Through the communicating hole 117b, the signal line 115 is inserted together with a packing 121. As a result, in the inside of the tip frame 111, an internal space 123 sealed by the holding member 117 is formed.

Further, in a part near the tip of the tip frame 111, an opening through which an image of the test subject 107 is acquired is formed. A cover glass 125 is attached to this opening part. A condenser lens 127 is arranged at a position adjacent to the cover glass 125. Further, the above-mentioned optical scanning element 100 is arranged in a manner of opposing to the condenser lens 127. The optical scanning element 100 is installed in a state of being inclined at approximately 45 degrees relative to the axis direction of the tip frame 111. Then, the optical path of incident light is changed by the above-mentioned micro mirror 29 (see FIG. 1) capable of performing rotational displacement. That is, light outputted through the ferrule 119 fixed to the holding member 117 is projected onto the optical scanning element 100 through a collimator lens 129 supported by the holding member 117. Then, its reflected light is scanned and projected onto the test subject 107.

Here, the individual electrodes on which the drive signals (corresponding to the above-mentioned $\phi V1$ to $\phi V4$) for causing scanning drive in the optical scanning element 100 are applied are connected to the scanning drive section 105 (see FIG. 24) through the signal line 115.

The ferrule 119 arranged at a position of going through the center part of the holding member 117 has a minute through hole going through the center part. Then, to one end of this, the optical fiber 101 is connected. The opening on the other end side is released. Thus, the optical system of the optical scanning probe 400 shown in FIG. 24 constitutes a confocal optical system, and the ferrule 119 serves as a confocal pin hole. Illumination light is inputted from the light source 95 (see FIG. 24) into the optical fiber 101, and then emitted from the opening of the ferrule 119 as illumination light from a point light source. This illumination light is converted into a parallel light beam by the collimator lens 129, then incident onto the surface of the micro mirror 29 of the optical scanning element 100, then reflected by the surface of the micro mirror 29, then condensed by the condenser lens 127, and then projected onto the test subject 107 through the cover glass 125.

On the other hand, among the regions of the test subject 107, reflected light from a point corresponding to the scanning position determined by the inclination ($\theta_1$, $\theta_2$) of the surface of the micro mirror 29 of the optical scanning element 100 traces back the incident path, that is, passes through the cover glass 125, then is condensed by the condenser lens 127, then guided to the micro mirror 29 of the optical scanning element 100, then reflected by the surface of the micro mirror 29, then transmitted through the collimator lens 129, then incident onto the opening of the ferrule 119 serving as a confocal pin hole, and then guided to the light detection section 97 (see FIG. 24) via the optical fiber 101.

In such a confocal optical system, when a pin hole having a circular opening is arranged at a position (image position) conjugate to the focal position of the condenser lens 127, light only from an in-focus position can be detected. Further, in the confocal optical system, light emitted from the point light source is condensed and projected onto one point of the test subject 107 by the objective lens. Thus, in contrast to general illumination in which the entire test subject 107 is illuminated uniformly, unnecessary scattered light is not generated from the periphery part of the scanning position. This remarkably improves the contrast of the image. Thus, the surface of the inside of the body of a test subject such as the inside of a body tissue can be observed in the form of a high quality image.

At the time of the above-mentioned image acquisition, the control section 103 (see FIG. 24) recognizes the timing of the individual scanning control signals generated by the scanning drive section 105, that is, the scanning position of the micro mirror 29 of the optical scanning element 100. Then, in association with this scanning position, the control section 103 causes the signal processor 91 to process the electric signal inputted from the light detection section 97 and to output to the display section 93 the information of the two-dimensional image which is the acquired image of the test subject 107. Here, the description given above is made for a case that the employed optical scanning element is the optical scanning element 100 according to the first embodiment. However, the configuration of the optical scanning element 200 or 300 according to another embodiment may be employed.

Meanwhile, the magnitudes ($\Delta\theta_1$, $\Delta\theta_2$) of the inclination angles of the micro mirror 29 of the optical scanning element 100 that determine the scan field (field of image acquisition) vary in accordance with the magnitudes of the driving voltages applied on the individual electrodes of the optical scanning element 100. Nevertheless, when variation is present in the electrode-to-electrode distance and the like in the optical scanning element 100, an error arises in the actual scan field depending on the specific optical scanning element 100 even when the same driving voltage is applied. Further, environmental variation such as temperature variation can cause a change in the scan field.

Thus, in order to stabilize the actual scan field of optical scanning element 100, the control section 103 has a correction table 131 for correcting the driving voltage applied on the optical scanning element 100. That is, information indicating the relation between the values of the applied driving voltages and the actual inclination angles ($\theta_1$, $\theta_2$) are registered and held in a table in advance. Then, when the optical scanning element 100 is to be driven actually, in order that the scan field should have a desired size, the values of the driving voltages to be applied are determined with reference to the contents of the correction table 131.

The correction table 131 is generated by the time of product shipment of the endoscope. Further, the contents of the correction table 131 may be rewritable. Then, at the time of periodical maintenance, the contents of the correction table 131 may be rewritten. Further, when necessary, the contents of the correction table 131 may be updated at the time of power ON of the endoscope or alternatively at an arbitrary timing determined by the user.

Further, in a case that the correspondence relation between the scanning timing at the time of driving of the optical scanning element 100 and the actual scanning position is nonlinear, information indicating this relation is registered into the correction table 131.

Meanwhile, the individual movable sections of the optical scanning element 100 have a complicated structure, and still are of low mass. Thus, even when scan (rotational displacement of the movable sections) of the optical scanning element 100 is desired to be performed at a high speed, the viscosity of air affects the operation under the atmospheric pressure. This causes difficulty in high speed driving of the optical scanning element 100 at a high frequency. Thus, in order that the influence of the viscosity of air to the optical scanning element 100 should be suppressed, it is preferable that the optical scanning element 100 is used in a reduced pressure state having a low air density than the ordinary atmospheric condition.

Here, an example of an optical scanning element having a sealed structure in a reduced pressure state is described below.

Figure 26:
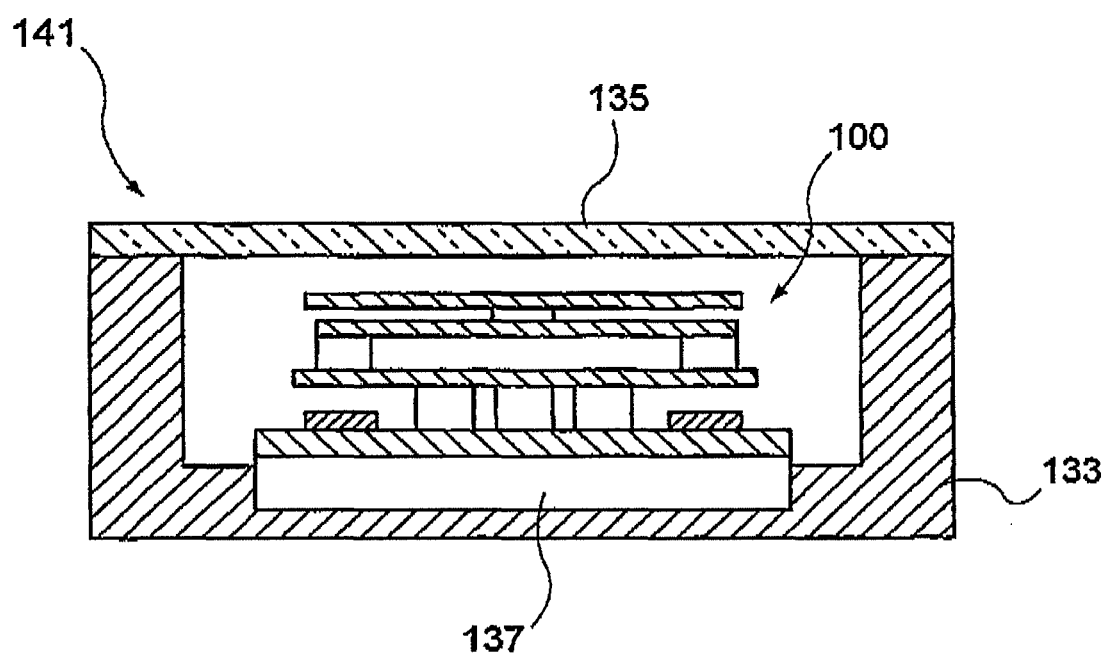
FIG. 26 is a longitudinal sectional view showing an exemplary configuration of an optical scanning element sealed in a reduced pressure.

FIG. 26 is a longitudinal sectional view showing an exemplary configuration of an optical scanning element sealed in a reduced pressure.

According to this optical scanning element 100, the optical scanning element 100 is accommodated in a package 133. Then, the internal space of the package 133 is in a reduced pressure state, and the package 133 is sealed by a transparent cover glass 135. Under the optical scanning element 100 in the package 133, a drive circuit 137 electrically connected to the individual electrodes of the optical scanning element 100 is arranged and takes the role of input and output of the drive signals after the optical scanning element 100 is enclosed in the package 133.

According to this packaged element 141, the movable sections of the optical scanning element 100 are driven under the environment of a reduced pressure state. This permits high speed drive with reduced influence of the viscosity of air. When this air pressure is set to be, for example, 0.1 atmospheric pressure or lower, the influence of the viscosity of air can be reduced to a practically sufficient extent. Then, when the packaged element 141 is arranged at a position of the optical scanning element 100 shown in FIG. 25 described above, an optical scanning probe is obtained that can perform higher speed image acquisition.

Figure 27:
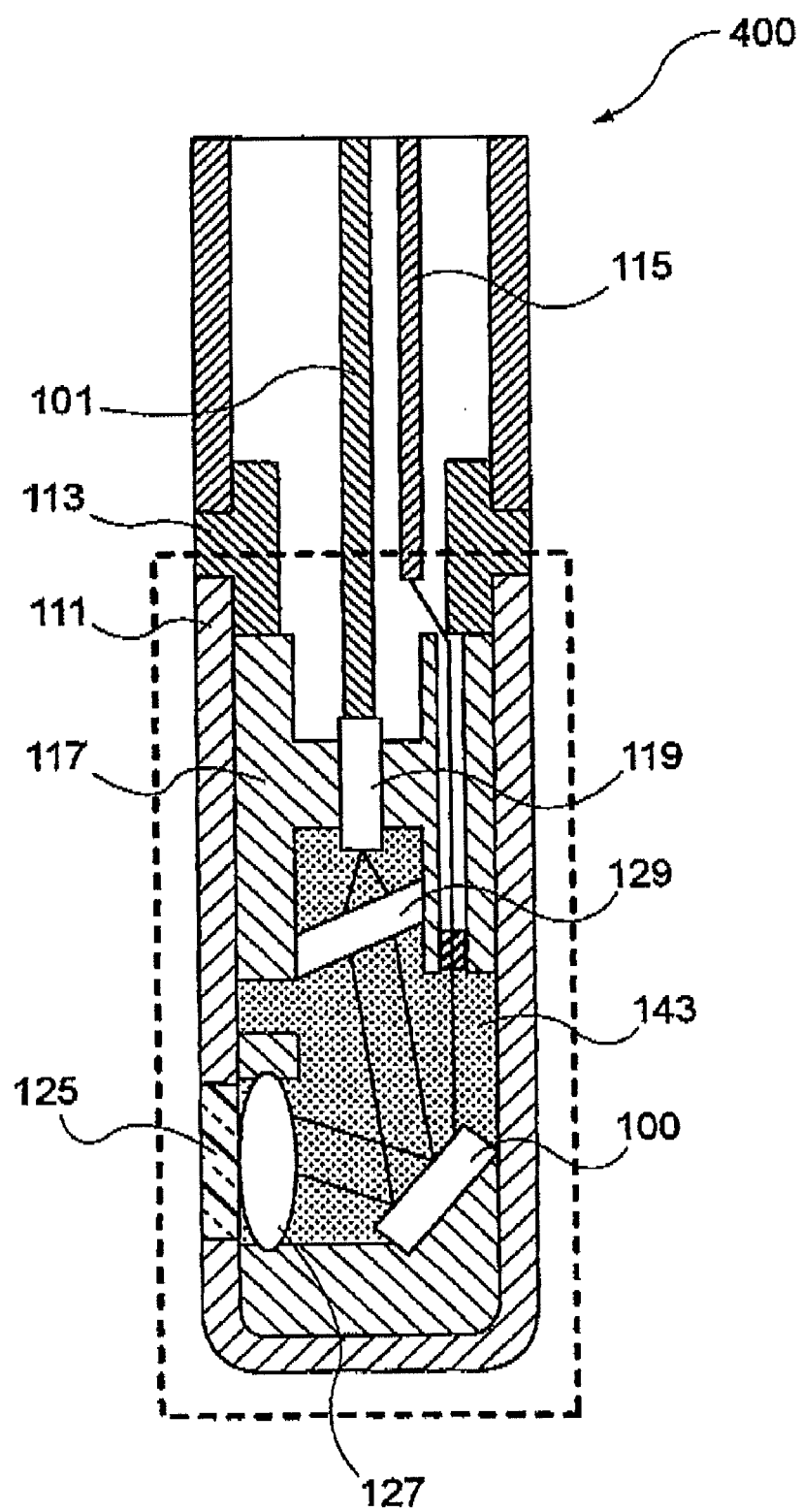
FIG. 27 is an explanation diagram showing a case that an internal space of a tip frame of an optical scanning probe is in a reduced pressure state.

Further, in place of enclosing the optical scanning element 100 into a package, the structure shown in FIG. 27 may be employed.

FIG. 27 is an explanation diagram showing a case that an internal space of a tip frame 111 of an optical scanning probe is in a reduced pressure state.

The configuration in this case is similar to that of the above-mentioned endoscope. However, a reduced pressure space 143 is formed inside the tip frame 111 of the optical scanning probe 400. This avoids the necessity of sealing independently the optical scanning element 100 in a reduced pressure, and hence simplifies the structure. Specifically, the members surrounded by a dotted line in the figure are fabricated under a reduced pressure environment, then sealed, and then fix to the optical scanning probe 400.

(Result of Structure Analysis of Detailed Example by Optical Scanning Element)

Next, a detailed structure of the optical scanning element and its result of operation analysis are described below.

Figure 28A:
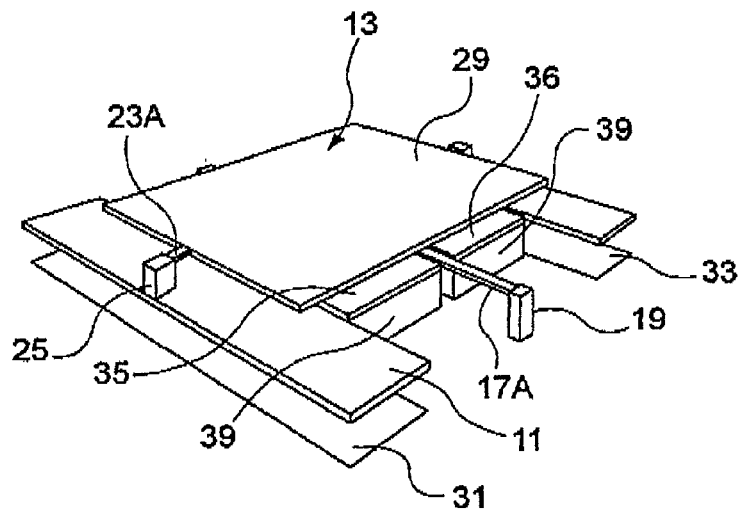
FIGS. 28A-28C are diagrams showing a structure of an optical scanning element employed in a structural analysis.
Figure 28B:
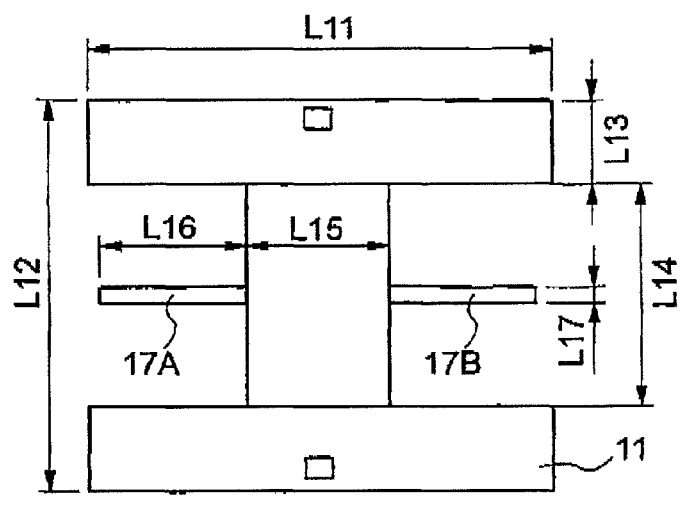
Figure 28C:
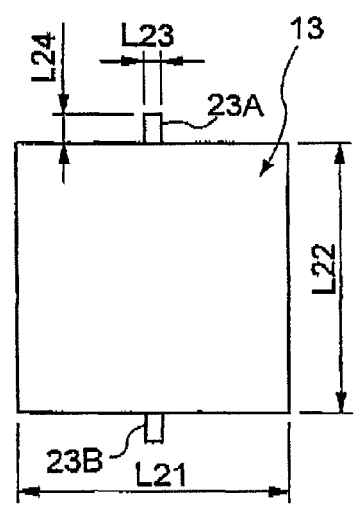

In this example, the structure of the optical scanning element was determined actually in a case that the number of scanning lines 300×300 was assumed. Then, structural analysis by finite element method was conducted. The structure of the optical scanning element employed in this structural analysis is shown in FIG. 28. FIG. 28A is a perspective view showing the overall configuration of the analysis model. FIG. 28B is a plan view showing the shape and the dimensions of the first movable plate 11. FIG. 28C is a plan view showing the shape and the dimensions of the second movable section (the second movable plate 13).

In FIG. 28, the individual dimensions are as follows.

L11=640 μm: L12=640 μm: L13=120 μm: L14=400 μm
L15=200 μm: L16=200 μm: L17=10 μm: L21=400 μm
L22=500 μm: L23=10 μm: L24=40 μm

Further, the thickness of the first movable plate 11 and the elastic support beams 17A and 17B was 10 μm. Further, the thickness of the second movable plate 13 was 10 μm. The thickness of the elastic support beams 23A and 23B was 4 μm. The material of the individual members was assumed to be Si in which Young's modulus was 170 GPa and the Poisson ratio was 0.26.

As a result of the structural analysis employing the above-mentioned model, the resonant frequency of the first movable plate 11 and the structure that performs displacement integrally with this was approximately 8 kHz. The resonant frequency of the second movable plate 13 was approximately 15 kHz. Thus, when the optical scanning element having this structure is to be driven, it is preferable that the first movable plate 11 is driven in an off-resonant state by using a drive frequency of 50 Hz and that the second movable plate 13 is driven in a resonant state by using a drive frequency (resonant frequency) of 15 kHz.

Next, the situation of drive of this model is described below with reference to FIG. 29.

Figure 29:
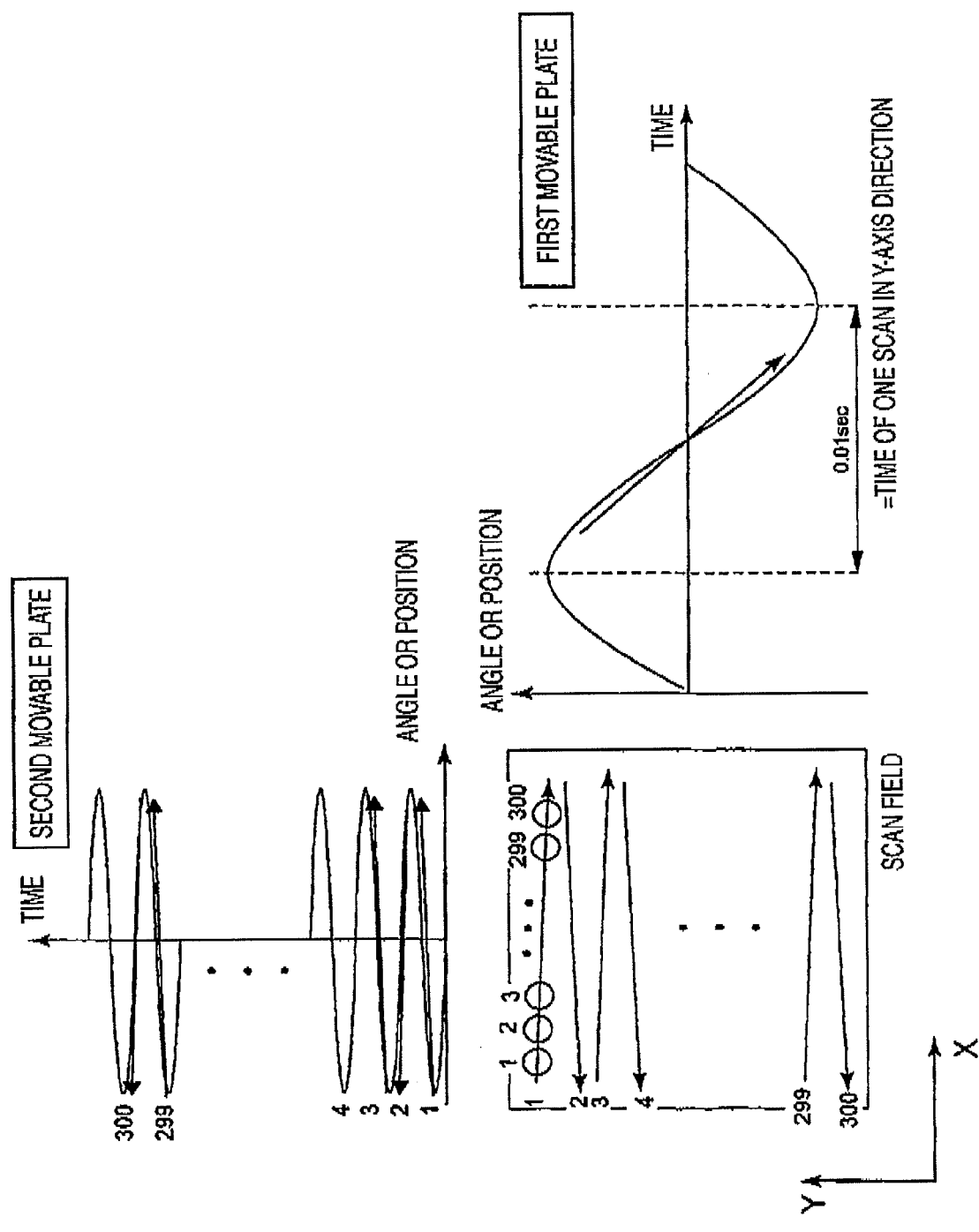
FIG. 29 is an explanation diagram showing an example of driving of an optical scanning element according to a model shown in FIG. 28.
Figure 30A:
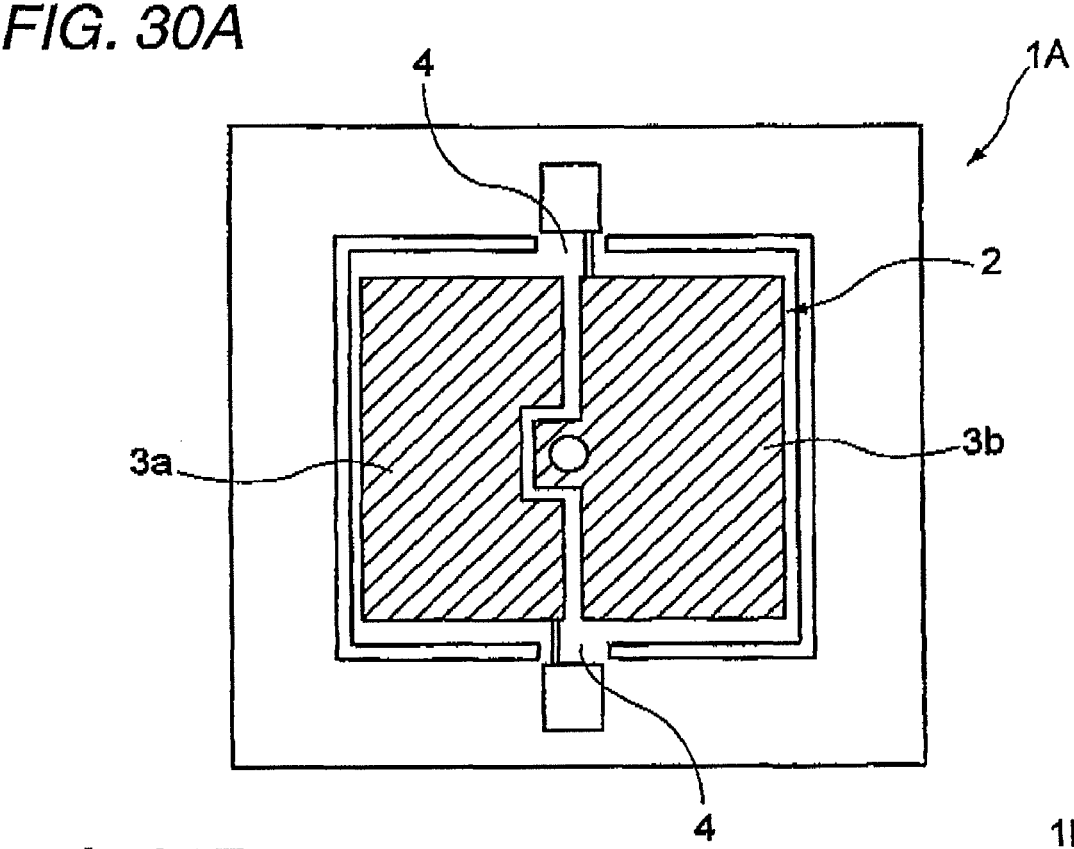
FIGS. 30A and 30B are plan views showing configurations of optical scanning elements in the related art.
Figure 30B:
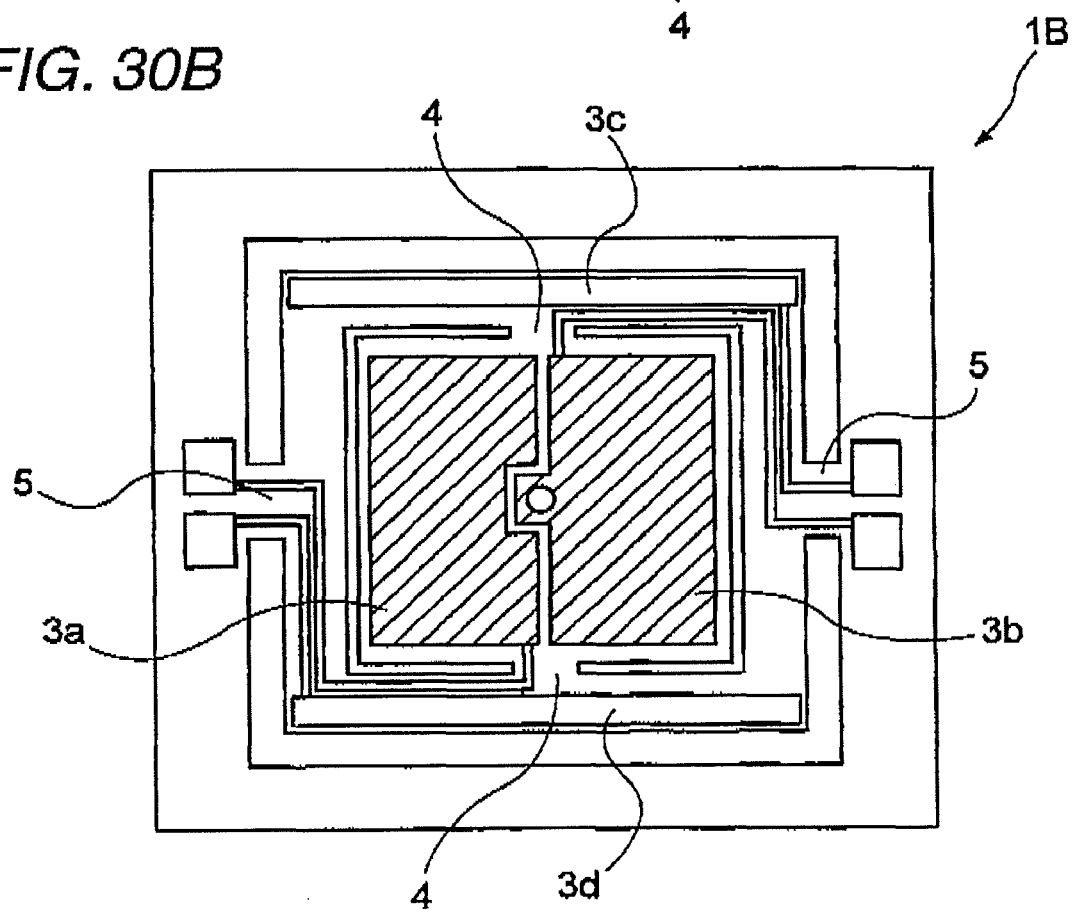
Figure 31:
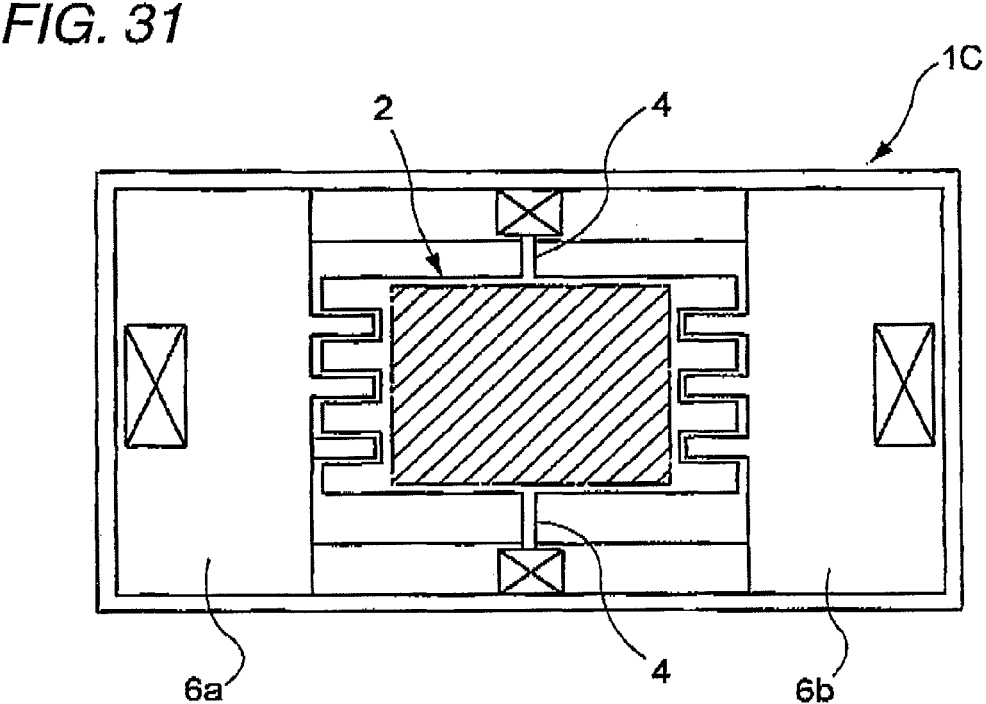
FIG. 31 is a plan view showing a configuration of an optical scanning element in the related art.
Figure 32:
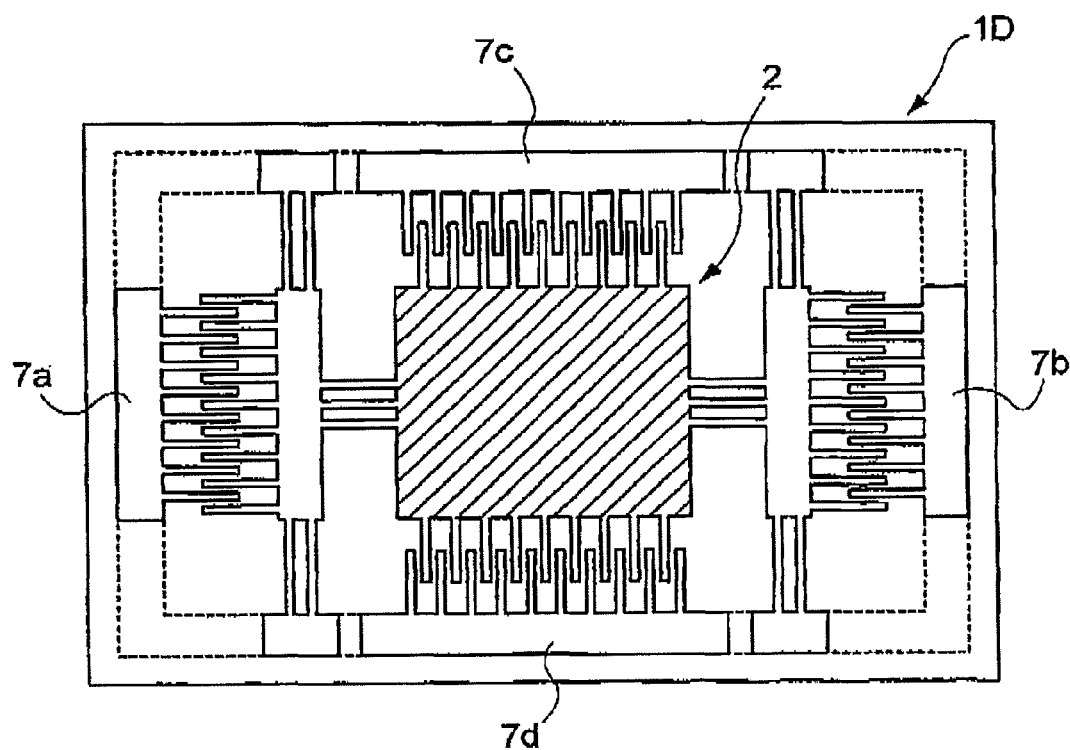
FIG. 32 is a plan view showing a configuration of an optical scanning element in the related art, wherein description of some numerals and symbols in the drawings are set forth below.

As shown in FIG. 29, the time period necessary for the first movable plate 11 scanning once in the Y-axis direction of the scan field is a half of the oscillation period. Thus, when the drive frequency of the first movable plate 11 is 50 Hz, the necessary time period is (1/50 Hz)/2=0.01 sec. During the time that the first movable plate 11 scans once in the Y-axis direction, the second movable plate 13 scans 300 times in the X-axis direction. Further, the time period necessary for the second movable plate 13 scanning once is, similarly, a half of the driving period. Thus, when the drive frequency (the resonant frequency, in this case) of the second movable plate 13 is assumed to be 15 kHz, the necessary time period is ((1/15 kHz)/2)×300=0.01 sec. This agrees with the time period that the first movable plate 11 scans once in the Y-axis direction. Thus, when these design values for the element are adopted, the second movable plate 13 can scan 300 times in the X-axis direction during the time that the first movable plate 11 scans once in the Y-axis direction.

Thus, when the 300 times of pulses are projected from the light source during one scan in the X-axis directions or alternatively a shutter of the detector is switched 300 times at a high speed, the scan field can be scanned in the form of measurement points of 300×300.

The optical scanning element according to each embodiment described above is applicable to various kinds of application such as a laser scanning recording device like a laser beam printer, a laser beam machining device, a laser scanning microscope, a laser scanner device, a laser display, and a retinal scanning display (RSD). Further, the above-mentioned optical scanning probe is preferably employed in a confocal optical system optical scanning probe device, a laser light computed tomography device (OCT), a blood vessel optical scanning probe device, and the like, and applicable to any other endoscope devices such as an endoscope device for medical application like an oral endoscope, a bronchus endoscope, and a colon endoscope, as well as to an endoscope device for industry.

What is claimed is:

1. An optical scanning element comprising:
   a substrate;
   a first movable section supported on the substrate so as to be capable of rocking displacement about a first axis parallel to a surface of the substrate;
   a second movable section arranged integrally on the first movable section and supported so as to be capable of rocking displacement about a second axis perpendicular to the first axis, the second movable section having a micro mirror on an upper surface thereof; and
   a driving section that applies a physical action force on the first movable section and the second movable section so as to cause the micro mirror to perform rocking displacement in two axial directions about the first axis and the second axis,
   wherein the driving section includes:
   a first driving section that applies a physical action force on the first movable section in a first rotational direction about the first axis;
   a second driving section that applies a physical action force on the first movable section in a second rotational direction opposite to the first rotational direction, the first and second driving sections being arranged within a region overlapping with the first movable section in a first thickness direction thereof when being viewed in the first thickness direction;
   a third driving section that applies a physical action force on the second movable section in a third rotational direction about the second axis; and
   a fourth driving section that applies a physical action force on the second movable section in a fourth rotational direction opposite to the third rotational direction,
   wherein the third driving section and the fourth driving section are arranged at a height position between the first movable section and the second movable section.

2. The optical scanning element according to any one of claim 1, further comprising a support member arranged in a region overlapping in a thickness direction of the second movable section and connected to the second movable section so as to be capable of elastic displacement.

3. The optical scanning element according to claim 1, wherein a maximum dimension of the second movable section in a direction perpendicular to the second axis is substantially equal to a maximum dimension of the first movable section in a direction along the first axis.

4. The optical scanning element according to claim 1, further comprising a sealed structure in which at least the first movable section and the second movable section are sealed in a reduced pressure state.

5. The optical scanning element according to claim 1, wherein the physical action force is an electrostatic force.

6. The optical scanning element according to claim 5, wherein each of the first movable section and the second movable section has conductive property at least in part and the first movable section and the second movable section are electrically connected to each other.

7. A method for driving an optical scanning element of claim 1, comprising:
performing main scanning drive on the second movable section at a first frequency; and
performing sub scanning drive on the first movable section at a second frequency lower than the first frequency such that the second movable section rocks multiple times during a time that the first movable section rocks once.

8. The method according to claim 7, wherein the first movable section and the second movable section start transiting from one rotational direction to another rotational direction before a lower end of the movable section contacts with a member located beneath a final displacement position of the one rotational direction.

9. The method according to claim 7, wherein the second movable section is driven to rock at a frequency substantially equal to a resonant frequency of the second movable section.

10. The method according to claim 7, wherein the second movable section is driven to rock at a frequency higher than a resonant frequency of the second movable section.

11. The method according to claim 10, wherein the first movable section is caused to rock at a frequency substantially equal to a resonant frequency of the structure integrated with the first movable section.

12. The method according to claim 7, wherein the second movable section is driven to rock at a frequency lower than a resonant frequency of the second movable section.

13. An optical scanning probe comprising:
a probe to be inserted into a body of a test subject;
a light source that generates light for illuminating the test subject;
a light transmitting section that guides the light from the light source to a tip part of the probe;
an optical scanning section that includes an optical scanning element according to claim 1 on a tip part of the probe and that performs two-dimensional scan of the test subject with the light guided from the light source to the optical scanning element;
a scanning drive section that provides a drive signal for driving rocking of the micro mirror to the optical scanning element of the optical scanning section; and
a reflected light transmitting section that guides, to a base end part, reflected light generated when the light of the two-dimensional scan performed by the optical scanning section is reflected from the test subject.

14. The optical scanning probe according to claim 13, comprising a member having a confocal pin hole in which a pin hole is between the light source and the optical scanning section and in which light passing through the pin hole forms substantially a point light source so that a confocal optical system is constructed with respect to the test subject.

15. The optical scanning element according to claim 1, wherein the third and fourth driving sections are arranged within a region overlapping with the second movable section in a second thickness direction thereof when being viewed in the second thickness direction.

16. The optical scanning element according to claim 1, wherein a part of the first movable section overlaps with a part of the second movable section in the first thickness direction when being viewed in the first thickness direction.

* * * * *